US012661606B2

(12) United States Patent
Bannister et al.

(10) Patent No.: US 12,661,606 B2
(45) Date of Patent: Jun. 23, 2026

(54) FILTER CARTRIDGE RETENTION FEATURE

(71) Applicant: Atmus Filtration Inc., Nashville, TN (US)

(72) Inventors: Robert A. Bannister, Ames, IA (US); Sudhindra Palaxa Arakeri, Shahapur (IN); Jayant Singh, Pune (IN); Pravin Shantinath Kadam, Kolhapur (IN); Joshua Luther Young, Livingston, TN (US)

(73) Assignee: ATMUS FILTRATION INC., Nashville, TN (US)

( * ) Notice: Subject to any disclaimer, the term of this patent is extended or adjusted under 35 U.S.C. 154(b) by 481 days.

(21) Appl. No.: 18/027,989

(22) PCT Filed: Oct. 1, 2021

(86) PCT No.: PCT/US2021/053064
§ 371 (c)(1),
(2) Date: Mar. 23, 2023

(87) PCT Pub. No.: WO2022/076248
PCT Pub. Date: Apr. 14, 2022

(65) Prior Publication Data
US 2023/0347266 A1     Nov. 2, 2023

(30) Foreign Application Priority Data
Oct. 8, 2020     (IN) .............................. 202041043936

(51) Int. Cl.
*B01D 29/15*     (2006.01)
*B01D 29/23*     (2006.01)

(52) U.S. Cl.
CPC ............. *B01D 29/15* (2013.01); *B01D 29/23* (2013.01); *B01D 2201/24* (2013.01);
(Continued)

(58) Field of Classification Search
CPC .... B01D 29/15; B01D 29/23; B01D 2201/24; B01D 2201/287; B01D 2201/295;
(Continued)

(56) References Cited

U.S. PATENT DOCUMENTS 5,395,509 A * 3/1995 Guerra Cisneros ... F25B 43/003
210/232
5,589,060 A 12/1996 Gebert et al.
(Continued)

OTHER PUBLICATIONS

International Search Report and Written Opinion issued for PCT Application No. PCT/US2021/053064 issued Feb. 11, 2022, 16 pages.

*Primary Examiner* — Madeline Gonzalez
(74) *Attorney, Agent, or Firm* — Benesch Friedlander Coplan & Aronoff LLP

(57)     ABSTRACT

A liquid filtration system is provided. The filtration system includes a filter head and a filter cartridge configured to be removably coupled to the filter head. The filter cartridge includes a shell housing and a filter element. The shell housing defines a first housing end, a second housing end, and a housing sidewall extending between the first housing end and the second housing end. The filter element is received within the shell housing and removably coupled to the shell housing. The filter element includes a media pack configured to filter matter from a fluid flowing therethrough and an endcap coupled to an end of the media pack. The endcap comprising a retaining member engaged with the shell housing.

18 Claims, 12 Drawing Sheets

(52) U.S. Cl.
CPC .. *B01D 2201/287* (2013.01); *B01D 2201/295*
(2013.01); *B01D 2201/347* (2013.01); *B01D*
*2201/4061* (2013.01); *B01D 2201/4084*
(2013.01); *B01D 2201/4092* (2013.01)

(58) Field of Classification Search
CPC ...... B01D 2201/347; B01D 2201/4061; B01D
2201/4084; B01D 2201/4092; B01D
29/21; B01D 39/00
USPC ....... 210/238, 237, 282, 244, 450, 455, 470,
210/465, 493.2
See application file for complete search history.

(56) References Cited

U.S. PATENT DOCUMENTS

| 5,753,117 | A | 5/1998 | Jiang |
|---|---|---|---|
| 5,855,772 | A | 1/1999 | Miller et al. |
| 10,046,263 | B2 | 8/2018 | Smith et al. |
| 2009/0249754 | A1 | 10/2009 | Amirkhanian et al. |
| 2010/0294707 | A1 | 11/2010 | Abdalla et al. |
| 2011/0296999 | A1 | 12/2011 | Foerster et al. |
| 2012/0205300 | A1 | 8/2012 | Piva et al. |
| 2014/0150388 | A1 | 6/2014 | Girondi |
| 2014/0231336 | A1 | 8/2014 | Pribanic et al. |
| 2015/0090653 | A1 | 4/2015 | Kotale et al. |
| 2016/0271533 | A1 | 9/2016 | Honermann et al. |
| 2017/0136412 | A1 | 5/2017 | Huda et al. |
| 2018/0001241 | A1 | 1/2018 | Zhibin |

* cited by examiner

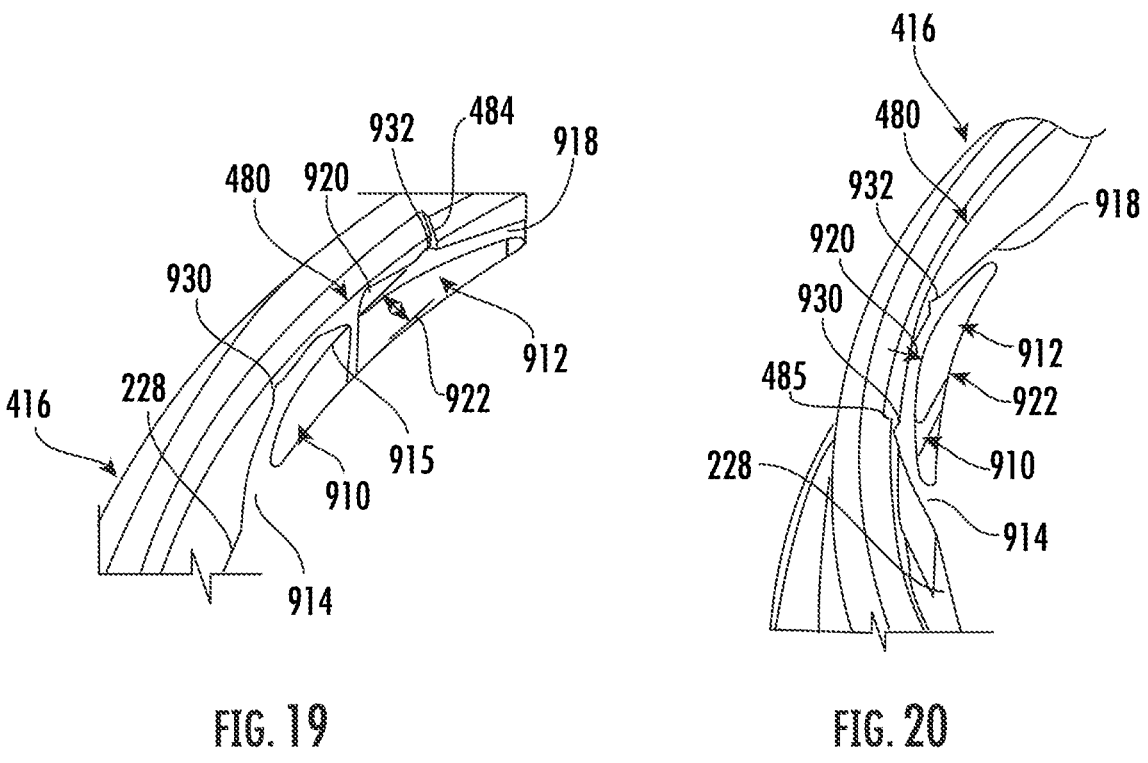
FIG. 19
FIG. 20
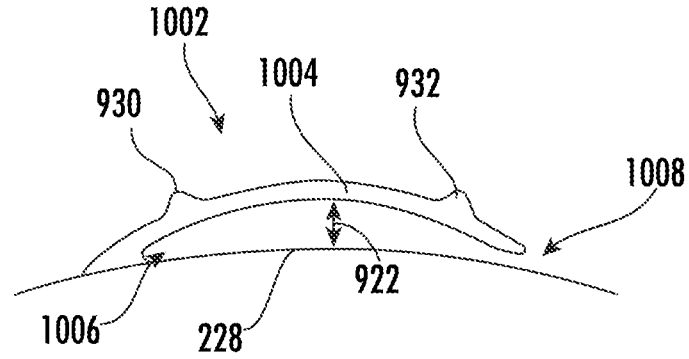
FIG. 21

FILTER CARTRIDGE RETENTION FEATURE

CROSS REFERENCE TO RELATED APPLICATIONS

This application is a National Phase based on PCT Application No. PCT/US2021/053064, filed Oct. 1, 2021, which claims the benefit of and priority to Indian Provisional Patent Application No. 202041043936, filed Oct. 8, 2020. The contents of these applications are incorporated by reference in their entireties.

TECHNICAL FIELD

The present application relates generally to liquid filtration systems for internal combustion engine systems.

BACKGROUND

In various applications, it is generally desirable to minimize an amount of particulate contamination in liquids used to power and lubricate an internal combustion engine. The amount of particulate contamination can be reduced by passing the liquids through a filter element or cartridge, which captures solid particles entrained within the fluid. The structure of the cartridge and the materials used in the construction of the cartridge may have a fixed orientation relative to the system that the cartridge is used with, such as a filter head. Because misalignment may prevent operation of the system or damage the system, cartridges are carefully controlled by an original equipment manufacturer (OEM) in order to prevent damage to the engine and to ensure optimal engine performance.

In some instances, a user may choose to replace the filter cartridge with a non-genuine (aftermarket) filter cartridge that is not produced by the OEM. The non-genuine filter cartridge may not adequately remove particulate contamination from the liquid which can, over a period of time, result in damage to the internal combustion engine.

SUMMARY

In one set of embodiments, a liquid filtration system includes a filter head and a filter cartridge. The filter cartridge is configured to be removably coupled to the filter head, such as by a threaded engagement. The filter cartridge includes a shell housing and a filter element. The shell housing includes a first housing end, a second housing end, and a housing sidewall extending between the first housing end and the second housing end. The filter element is received within the shell housing and is removably coupled to the shell housing. The filter element includes a media pack configured to filter matter from a fluid flowing therethrough and an endcap coupled to an end of the media pack. The endcap includes a retaining member engaged with the shell housing. In some embodiments, the shell housing is configured to limit rotation of the endcap relative to the shell housing.

In one set of embodiments, a filter cartridge includes a generally cylindrical shell housing and a filter element received within the shell housing. The shell housing includes a first housing end, a second housing end opposite to the first housing end, and a housing sidewall extending between the first housing end and the second housing end. The housing sidewall includes an inner housing surface and an outer housing surface. The shell housing further includes a groove extending about a perimeter of the shell housing proximate the first housing end. The groove interrupts the inner housing surface and defines a first groove surface contiguous with the inner housing surface. The first groove surface extends generally perpendicularly to the inner housing surface. The filter element includes an endcap having a retaining member engaged with the first groove surface. The retaining member is configured to prevent translational movement of the filter element out of the shell housing. In some embodiments, the retaining member cooperates with the shell housing to prevent rotational movement of the filter element relative to the shell housing.

In one set of embodiments, a filter element includes a media pack, a first end cap, and a second endcap. The media pack is configured to filter matter from a fluid flowing therethrough. The first endcap coupled to a first end of the media pack, the first endcap comprising a retaining member configured for coupling to a shell housing. The retaining member comprises a first retainer projection extending radially away from first endcap and configured to engage the shell housing to couple the first endcap to the shell housing. The second endcap is coupled to a second end of the media pack, the second end being opposite to the first end.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 19 is a detailed perspective view of the filter cartridge of FIG. 17 at a location where a filter element engages with the shell housing of FIG. 18, according to an example configuration;

FIG. 20 is a detailed perspective view of the filter cartridge of FIG. 17 at a location where a filter element engages with the shell housing of FIG. 18, according to another example configuration;

FIG. 21 is a detailed top view of a portion of a first endcap according to yet another embodiment;

Figure 1:
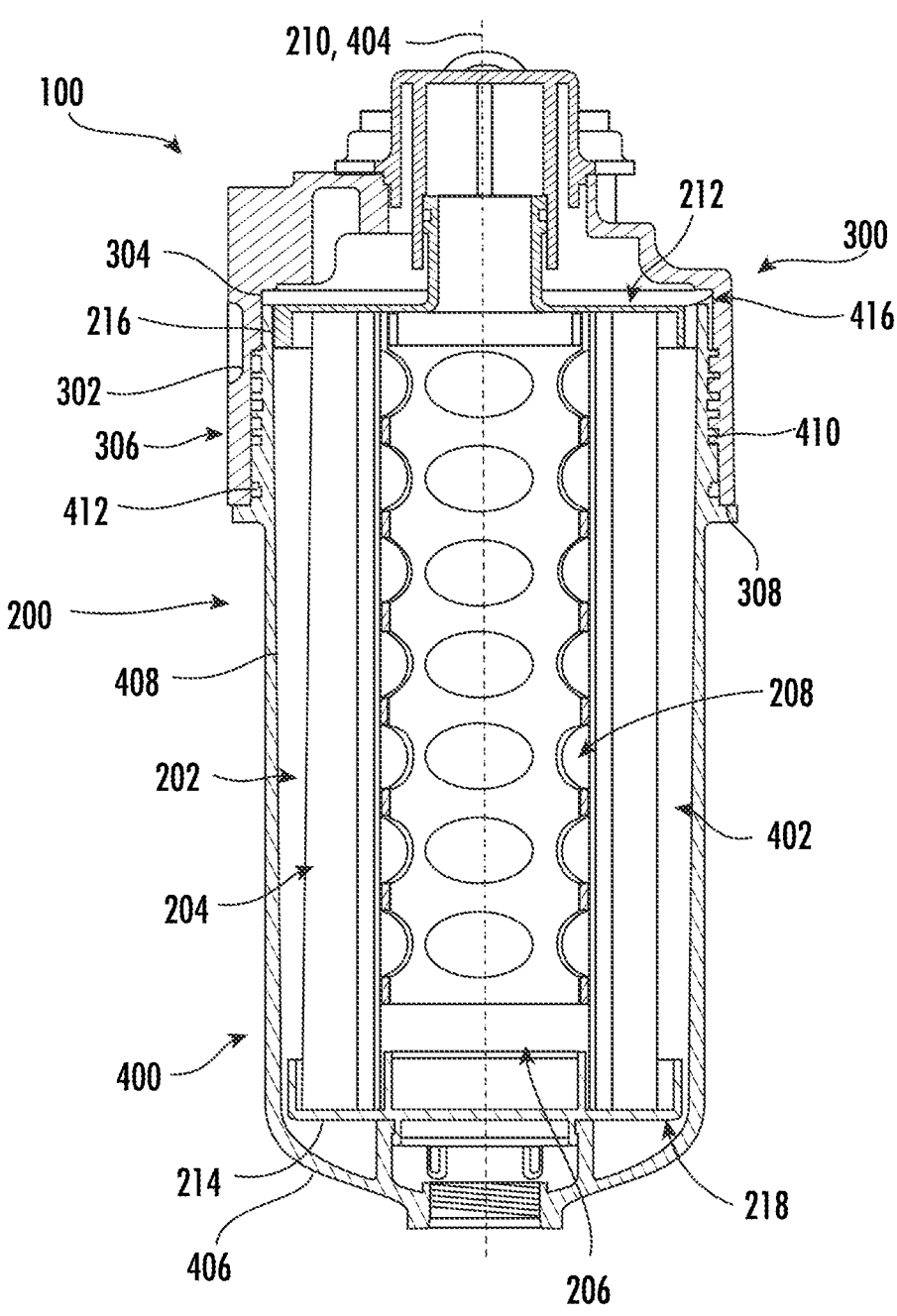
FIG. 1 is a side cross-sectional view of an example liquid filtration system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for sealing and retaining a filter element within a shell housing. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engine systems require a clean source of fuel to power the engine. Unfiltered fuel may include dirt, metal particles, and other solid contaminants that can damage fuel injectors and other engine components. In order to protect the injectors, many internal combustion engine systems include fuel filtration systems, which filter the fuel to remove any solid materials before passing the fuel to the injectors. The filtration system may include a filter cartridge and a filter head. In operation, the filtration system directs the fuel through the filter cartridge, which includes a filter element that captures any solid particulate entrained in the fuel. The performance of the filtration system depends, among other factors, on the structure of the filter cartridge and the materials used to construct the filter cartridge (e.g., the materials used to produce a filter element for the filter cartridge, the specifications of the filter element and the media pack such as the flow area of the media pack, the pleat depth of the media pack, and other factors).

Over time, accumulated particulate on the filter cartridge (e.g., carbon, dust, metal particles, etc.) can increase the pressure drop across the filter cartridge (and, correspondingly, a pressure drop across a fuel delivery system for the engine). In order to reduce the pressure drop, the filter cartridge can be removed from the filtration system and replaced with a clean filter cartridge. In some embodiments, the filter element of the filter cartridge may be removed and replaced with a new filter element.

Implementations herein relate to methods and systems of retaining a filter element in a shell housing to facilitate a unique sealing interface between a filter cartridge and a filter head. The retaining members engage a portion of the shell housing and, in some embodiments, limit rotation of the filter element such that a sealing member may have a fixed orientation relative to the filter head. In order to ensure that the sealing member is properly aligned during installation, the retaining member includes an anti-rotation member, which engages (e.g., contacts, interfaces with, etc.) a portion of the shell housing to orient the filter element relative to a sealing interface on the filter head.

I. Example Liquid Filtration System

FIG. 1 is a cross-sectional view of a first example liquid filtration system, shown as system 100. The system 100 may be used to filter a fluid provided to an internal combustion engine. The fluid may be a fuel, an engine oil, a hydraulic oil, or another lubricant. In the example embodiment of FIG. 1, the system 100 is a fuel filtration system for a diesel engine that uses diesel fuel to drive the combustion process. The system 100 is configured to be mounted on the diesel engine. In other embodiments, the system 100 may be configured to be mounted remotely from the engine (e.g., on a vehicle chassis, etc.).

As shown in FIG. 1, the system 100 includes a filter cartridge 200 and a filter head 300. The filter cartridge 200 (e.g., filter cartridge assembly, cartridge assembly, etc.) is removably coupled to the filter head 300 to allow for the filter cartridge 200 to be serviced or replaced. In some embodiments, the filter cartridge 200 is threadably coupled to the filter head 300. The filter cartridge 200 includes a filter element 202 and a shell housing 400. In some embodiments, the filter element 202 and the shell housing 400 are coupled together, for example by fasteners or adhesives, such that separation of the filter element 202 and the shell housing 400 cannot be separated without a physical destruction of one or more components. In some embodiments, the filter element 202 is removably coupled to the shell housing 400 such that the filter element 202 may be removed from the shell housing 400 and replaced with a new filter element.

The filter element 202 is disposed within a hollow portion 402 of the shell housing 400 such that a central axis 404 of the shell housing 400 extends through the filter element 202. The filter element 202 may be cylindrically-shaped and may include a cylindrically-shaped media pack 204. The media pack 204 includes filter media configured to filter particulate matter from a fluid flowing therethrough so as to produce filtered fluid (e.g., clean fluid). The filter media may include a porous material having a predetermined pore size. The filter media may include a paper-based filter media, a fiber-based filter media, a foam-based filter media, or the like. The filter media may be pleated or formed into another desired shape to increase a flow area through the media pack 204, or to otherwise alter the particle removal efficiency of the filter element 202. The filter element 202 may be arranged as an outside-in flow filter element having an outer dirty side and an inner clean side. In an alternative arrangement, the filter element 202 is an inside-out filter element having an inner dirty side and an outer clean side. Fluid to be filtered passes from the dirty side of the filter element 202 to the clean side of the filter element 202.

The filter element 202 defines a central opening 206 extending along a central axis 210 (e.g., a longitudinal axis, up and down as shown in FIG. 1) of the filter element 202. In some embodiments, the filter element 202 is positioned within the shell housing 400 such that the central axis 210 of the filter element 202 is coaxial (e.g., coincident) with the central axis 404 of the shell housing 400. A center support tube 208 is positioned within the media pack 204 and extends longitudinally along at least a portion of the central opening 206 from a first, upper end 212 of the filter element 202 to a second, bottom end 214 of the filter element 202. The media pack 204, and thus the support tube 208, is concentric with the filter element 202 and the shell housing 400. In other words, a central axis of the media pack 204 is coaxial or substantially coaxial with the central axis 210 of the filter element 202 as a whole and the central axis 404 of the shell housing 400. As shown in FIG. 1, the support tube 208 is formed in the shape of a hollow cylinder. An outer wall of the support tube 208 is perforated in order to allow fluid to pass through the support tube 208.

The shell housing 400 defines a hollow portion 402 having an inner cross-sectional diameter within which the filter element 202 is positioned. The shell housing 400 (e.g., a filter housing, container, or reservoir) includes an upper (e.g., first) end 416, a lower (e.g., second) end 406, and a sidewall 408 extending between the upper end 416 and the lower end 406 in a substantially concentric orientation relative to the central axis 404. The shell housing 400 may be formed from a strong and rigid material. For example, the shell housing 400 may be formed from a plastic material (e.g., polypropylene, high density polyethylene, polyvinyl chloride, nylon, etc.), a metal (e.g., aluminum, stainless steel, etc.), or another suitable material. The cross-sectional shape of the shell housing 400 may be the same or similar to the cross-sectional shape of the filter element 202. As shown in FIG. 1, the shell housing 400 is formed in the shape of a cylinder such that the shell housing 400 has a generally circular cross-section normal to the central axis 404 of the shell housing 400. In other embodiments, the shell housing 400 may have any other suitable cross-sectional shape; for example, racetrack/obround, oval, rounded rectangular, or another suitable shape.

As shown in FIG. 1, the shell housing 400 is threadably coupled to the filter head 300. The shell housing 400 includes a male threaded portion 410 disposed on the sidewall 408 of the shell housing 400 and extending downwardly (e.g., parallel to the central axis 404 of the shell housing 400) from a first, upper end 416 of the shell housing 400. The male threaded portion 410 is engaged with a female threaded portion 302 of the filter head 300. As shown in FIG. 1, the female threaded portion 302 is disposed on an inner surface 304 of an outer flange 306 of the filter head 300 such that, in an installed position (as shown in FIG. 1), the outer flange 306 at least partially surrounds the shell housing 400. The shell housing 400 and/or the filter head 300 may include one or more sealing mechanisms to prevent fluid from leaking into an environment surrounding the system 100. As shown in FIG. 1, the shell housing 400 includes a radial sealing member 412 (e.g., an O-ring, etc.) that presses against the inner surface 304 of the outer flange 306 proximate to a lower edge 308 of the outer flange 306.

Figure 2:
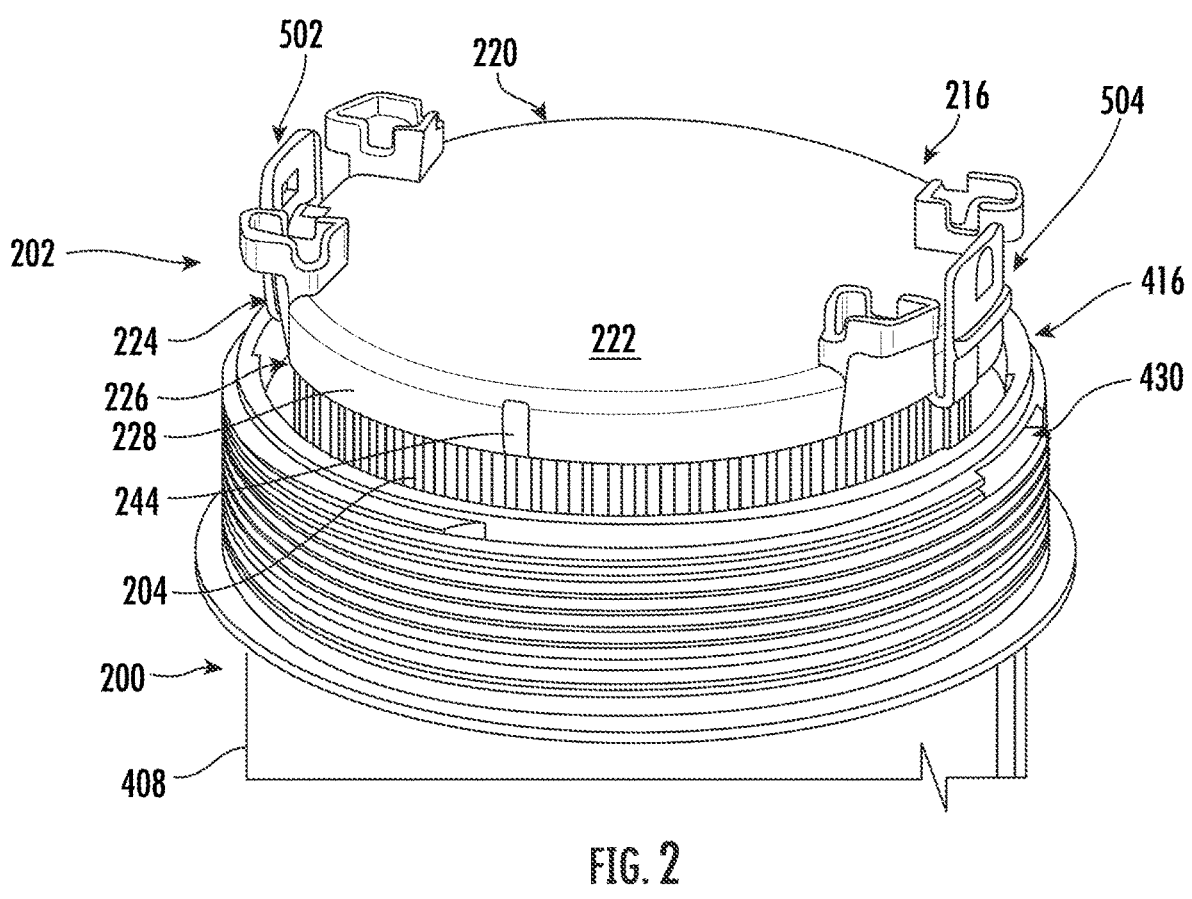
FIG. 2 is a partially exploded view of a filter cartridge used in a liquid filtration system.

The filter element 202 is structured to detachably (e.g., removably) couple to the shell housing 400 and the filter head 300. The filter element 202 includes a first endcap 216 coupled to the first end 212 of the filter element 202 and a second endcap 218 coupled to the second end 214 of the filter element 202. The first endcap 216 and the second endcap 218 may be coupled to the media pack 204 using glue or another suitable bonding agent (e.g., adhesive product) in order to seal the first end 212 and the second end 214 of the media pack 204 and to prevent dirty fluid from bypassing the filter media through the first end 212 and the second end 214. In some embodiments, the first endcap 216 and the second endcap 218 are coupled to the media pack 204 without the use of adhesives. For example, a portion of the first endcap 216 may be heated to a molten state. The media pack 204 may then be plunged into the molten portion of the first endcap 216 to seal the media pack 204 to the first endcap 216. Similarly, a portion of the second endcap 218 may be heated to a molten state. The media pack 204 may then be plunged into the molten portion of the second endcap 218 to seal the media pack 204 to the second endcap 218. Coupling the first endcap 216 and the second endcap 218 in this way may reduce or eliminate the need for using adhesives, potting, or similar compounds to couple the media pack 204 to the first endcap 216 and the second endcap 218. FIG. 2 shows a perspective top view of the filter element 202, and more specifically the first endcap 216, being inserted into the hollow portion 402 of the shell housing 400.

Referring now to FIG. 2, a perspective view of the first endcap 216 is shown. The first endcap 216 includes a first retaining member 502 and a second retaining member 504, the first retaining member 502 and the second retaining member 504 configured to couple the filter element 202, and more specifically the first endcap 216, to the shell housing 400. When the filter element 202 is positioned within the shell housing, the first endcap 216 is coupled to both the media pack 204 and the shell housing 400. In some embodiments, the first retaining member 502 and the second retaining member 504 cooperate to prevent the filter element 202 from falling out of the shell housing 400 (e.g., from unintentionally being displaced from the hollow portion 402) in the event the system 100 is turned upside-down, shaken, or similarly moved in an unexpected way. In some embodiments, the first retaining member 502 and the second retaining member 504 cooperate to facilitate a sealing engagement between the first endcap 216 and the shell housing 400.

In some embodiments, the first retaining member 502 and the second retaining member 504 cooperate to limit rotation (e.g., allow a limited amount of rotation) of the first endcap 216 and, in some embodiments the filter element 202, relative to the shell housing 400. In some embodiments, the first retaining member 502 and the second retaining member 504 cooperate to prevent rotation (e.g., allow no rotation) of the first endcap 216 relative to the shell housing 400. For example, the first retaining member 502 and the second retaining member 504 may engage a slot, cavity, projection, or similar feature built within, integrated within, or coupled to the shell housing 400 that engages one of or both of the first retaining member 502 and the second retaining member 504 and prevents or limits rotation of the first endcap 216 and the filter element 202. In some embodiments, the first endcap 216 is configured to be coupled to the shell housing 400 in one position. For example, the first retaining member 502 and the second retaining member 504 may be asymmetrically positioned about a circumference of the first endcap 216 and only facilitate engagement with the shell housing 400 in one rotational orientation. In some embodiments, the first retaining member 502 and the second retaining member 504 are positioned symmetrically about the circumference of the first endcap 216 and facilitate engagement with the shell housing 400 in two rotational orientations.

The first endcap 216 includes a generally annular body 220 configured to be coupled to, and in some embodiments, receive, the media pack 204. Coupled to the annular body

220 are the first retaining member 502 and the second retaining member 504. The first retaining member 502 is coupled to the annular body 220 at 180-rotational degrees from the second retaining member 504 relative to the central axis 404. In some embodiments, the first endcap 216 may include more than two (e.g., three, six, etc.) retaining members. In some embodiments, the first retaining member 502 and the second retaining member 504 are integrally formed with the annular body 220 such that the first endcap 216 is formed as a single, non-separable component, such as by injection molding or 3D printing. The annular body 220 further includes a generally planar first surface 222 defining a first body end 224. In some embodiments, the first endcap 216 is a closed endcap such that the first surface 222 is solid and does not include any through apertures. In some embodiments, the first endcap 216 is an open endcap (FIGS. 1, 7, 14-16, 22, and 23) that includes at least one through aperture extending through and interrupting the first surface 222 (e.g., in fluid communication with the central opening 206. Extending between the first body end 224 and a second body end 226 is a generally annular side body surface 228. The side body surface 228 extends axially along a portion of the media pack 204 in a direction toward the second endcap 218.

Figure 3:
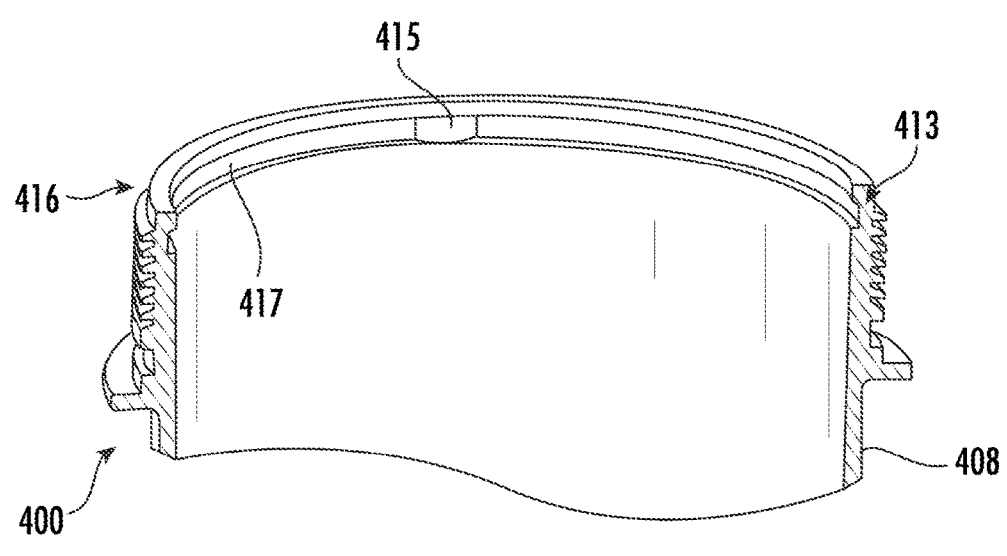
FIG. 3 is a detailed cross-sectional view of the shell housing of FIG. 2.

Referring now to FIG. 3, a cross-sectional perspective view of the shell housing 400 is shown according to an example embodiment. The shell housing 400 includes a shell groove 413 proximate to the upper end 416. The shell groove 413 extends about a circumference of the shell housing 400. In some embodiments, the shell groove 413 includes a cavity or divot, shown as a groove cavity 415 (e.g., an anti-rotation member, an anti-rotation feature, etc.). The groove cavity 415 may extend radially away from a circumferentially extending groove surface 417 in a direction substantially toward the sidewall 408. In some embodiments, the groove cavity 415 is configured to receive a portion of the first endcap 216 to limit rotation of the first endcap 216, and thus the filter element 202, relative to the shell housing 400. For example, if an attempt were made to rotate the first endcap 216 relative to the shell housing 400 when the first endcap 216 is coupled to the shell housing 400, the first retaining member 502 and the second retaining member 504 may interface with the groove cavity 415 and be prevented from continuing rotation. In some embodiments, the shell groove 413 includes a plurality of groove cavities 415 configured to limit the rotation of the first endcap 216 to various degrees. For example, the plurality of groove cavities 415 may be positioned such that rotation of the first endcap 216 is completely prevented once the first endcap 216 is coupled to the shell housing 400 (e.g., the first retaining member 502 and the second retaining member 504 are partially disposed within the shell groove 413).

Referring again to FIG. 2, the first endcap 216 may further include a projection extending radially away from the annular body 220, shown as an anti-rotation member (e.g., projection, feature, etc.) 244. The anti-rotation member 244 may be configured to be received within the groove cavity 415 such that rotation of the first endcap 216 relative to the shell housing 400 is prohibited when the anti-rotation member 244 is received by the groove cavity 415. In some embodiments, the anti-rotation member 244 cooperates with the groove cavity 415 to provide a tactile feeling to an installer of the filter element 202 when the first endcap 216 is properly oriented in the shell housing 400. For example, the filter element 202 may be received within the shell housing 400, but may be in the incorrect rotational position. As the installer rotates the filter element 202 relative to the shell housing 400, the anti-rotation member 244 travels in the shell groove 413. When the anti-rotation member 244 and the groove cavity 415 are aligned, the installer may feel a click or change in resistance when rotating. In some embodiments, the anti-rotation member 244 and the groove cavity 415 cooperate to restrict or limit rotation, but do not absolutely prevent rotation.

Figures 4, 5:
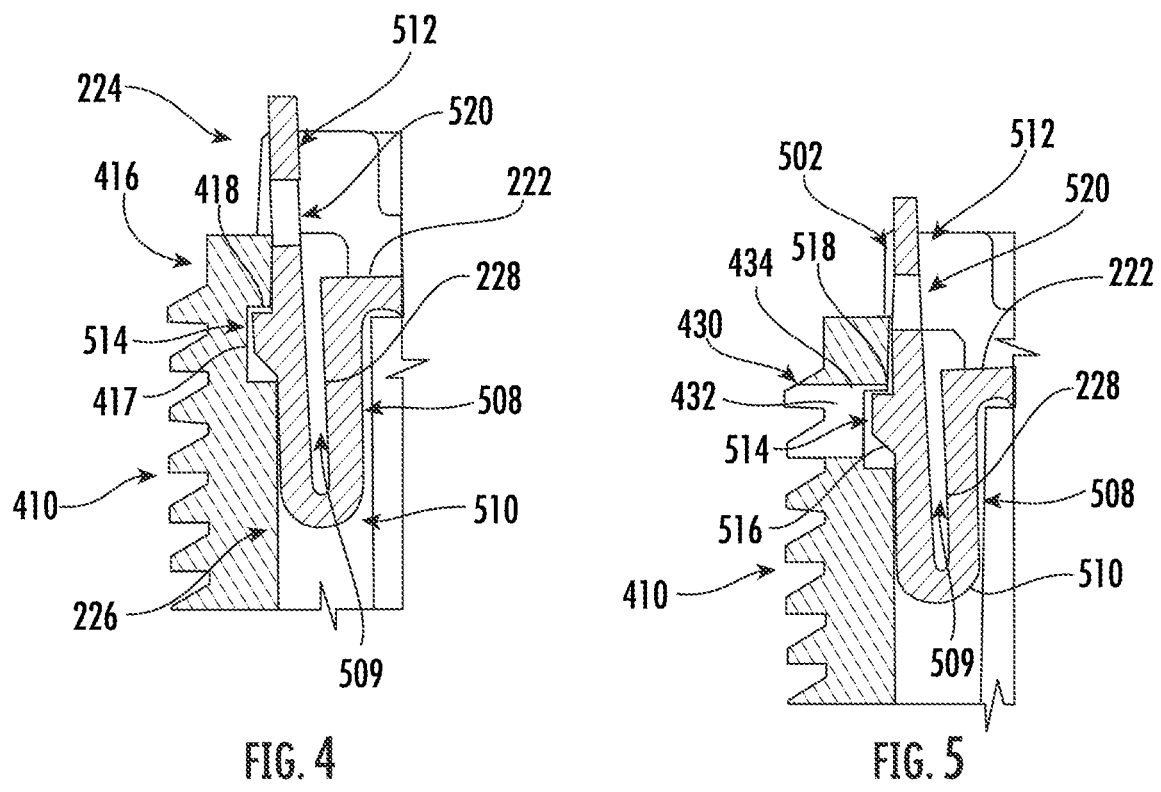
FIG. 4 is a detailed cross-sectional view of the filter cartridge of FIG. 2 at a location where a filter element of the liquid filtration system engages with a shell housing of the liquid filtration system.
FIG. 5 is a detailed cross-sectional view of a filter cartridge at a location where a filter element of the liquid filtration system engages with a shell housing of the liquid filtration system, according to an example embodiment.

As shown in FIG. 4, the first retaining member 502 includes a first retainer first portion 508, a first retainer compliant portion 510, a first retainer second portion (e.g., tab, retainer tab) 512, and a first retainer projection 514 extending radially away from the first retainer second portion 512 in a direction generally away from the central axis 404. The first retainer first portion 508 extends axially away from the surface 222 and in a direction toward the second endcap 218. The first retainer first portion 508 includes a portion of the side body surface 228. The first retainer compliant portion 510 extends away from the first retainer first portion 508 proximate to the second body end 226. The first retainer compliant portion 510 may have a U- or J-shape and the first retainer compliant portion 510 is contiguous with both the first retainer first portion 508 and the first retainer second portion 512. The first retainer second portion 512 extends axially away from the first retainer compliant portion 510 in a direction away from the second endcap 218. The first retainer second portion 512 is separated from the first retainer first portion 508 by a radial gap 509. At least a portion of the first retainer second portion 512 is disposed adjacent to the first retainer first portion 508. In some embodiments, the first retainer second portion 512 extends in a direction substantially parallel to the first retainer first portion 508. In some embodiments, the first retainer second portion 512 extends axially beyond (e.g., above) the first surface 222. For example, an axial height of the first retainer second portion 512 may be greater than an axial height of the first retainer first portion 508 and greater than the distance between the first body end 224 and the second body end 226. In some embodiments, when the first endcap 216 is coupled to the shell housing 400, a portion of the first retainer second portion 512 may extend above the upper end 416.

The first retainer projection 514 is configured to be disposed within the shell groove 413 when the first endcap 216 is coupled to the shell housing 400. In other words, the first retainer projection 514 cooperates with the shell groove 413 to couple the first endcap 216 to the shell housing 400. As shown in FIG. 4, the first retainer projection 514 extends away from an approximate center portion of the first retainer second portion 512. In some embodiments, the first retainer projection 514 extends away from the first retainer second portion 512 at a point between the first surface 222 and the first retainer compliant portion 510. The first retainer projection 514 includes a first ramp surface 516 and a first stop surface 518. When the first endcap 216 is inserted into the hollow portion 402, the first ramp surface 516 interfaces with the shell housing 400. The shell housing 400 biases the first retainer projection 514 in a direction generally radially inward toward the central axis 404. The first retainer compliant portion 510 deforms in response to the first retainer projection 514 moving radially in a direction toward the first retainer member portion 508. In some embodiments, the first retainer compliant portion 510 facilitates movement of the first retainer second portion 512 toward the first retainer first portion 508 as the first endcap 216 is inserted into the hollow portion 402.

The first retainer compliant portion 510 is further configured to maintain the radial gap 509 between the first retainer first portion 508 and the first retainer second portion 512.

For example, when the first retainer second portion 512 is in confronting relation to (e.g., contacting) the first retainer first portion 508, the first retainer compliant portion 510 applies a force to the first retainer second portion 512 in a direction radially away from the first retainer first portion 508.

When the first endcap 216 is coupled to the shell housing 400, the first retainer compliant portion 510 biases the first retainer projection 514 radially into the shell groove 413. The first stop 418 is configured to prevent translational movement of the filter element 202 in a direction generally away from the lower end 406 along the central axis 404. In some embodiments, the shell housing 400 does not include the groove cavity 415, and thus the first endcap 216 may rotate relative to the shell housing 400 while the first endcap 216 is coupled to the shell groove 413.

As shown in FIG. 5, the shell housing 400 may further include a first receptacle 430 (e.g., orifice, cut-out, hole, aperture, etc.) extending through the sidewall of the shell housing 400 and configured to receive the first retainer projection 514. The first receptacle 430 is defined by receptacle sides 432 and a receptacle interface surface 434 configured to interface with the first stop surface 518. In some embodiments, the first retainer projection 514 is configured to extend into the first receptacle 430 and beyond the groove surface 417. By extending beyond the groove surface 417, the first retainer projection 514 may interface with the receptacle sides 432 if an attempt to rotate the first endcap 216 is made while the first endcap 216 is coupled to the shell housing 400. In some embodiments, a receptacle width 436 (e.g., a distance between the receptacle sides 432) is substantially equal to a width of the first retainer projection 514 such that rotation of the first endcap 216 is substantially prevented when the first retainer projection 514 extends into the first receptacle 430 and beyond the groove surface 417.

In some embodiments, the shell housing 400 includes both the shell groove 413 and the first receptacle 430. For example, the first endcap 216 may be positioned within the shell housing 400 and coupled to the shell groove 413. Upon rotating the first endcap 216, the first retainer projection 514 eventually passes over and extends into the first receptacle 430, biased by the first retainer compliant portion 510. When the first retainer projection 514 is received within the first receptacle 430, rotation of the first endcap 216 relative to the shell housing 400 may be prevented. In some embodiments, the shell housing 400 includes the first receptacle 430 and does not include the shell groove 413. For example, the first retaining member 502 may be aligned with (e.g., above, below, etc.) the first receptacle 430 before inserting the first endcap 216 into the shell housing 400. If the first retaining member 502 is not aligned with the first receptacle 430 before the first endcap 216 is inserted into the shell housing 400, the first retainer projection 514 may interface with the inner surface of the shell housing 400, but may not engage the shell housing 400 and may be removed from the shell housing 400 without having to engage the first retaining member 502.

In some embodiments, the first retaining member 502 further includes an orifice, shown as a first orifice 520. The first orifice 520 extends through the first retainer second portion 512 and is positioned above the first retainer projection 514 (e.g., between the first retainer projection 514 and an end of the first retainer second portion 512 opposite to the first retainer compliant portion 510). In some embodiments, the first orifice 520 is configured to receive a tool (e.g., pry bar, screwdriver, etc.) such that the tool may bias the first retainer second portion 512 toward the first retainer first portion 508 to remove (e.g., decouple) the first endcap 216 from the shell housing 400.

Figure 6:
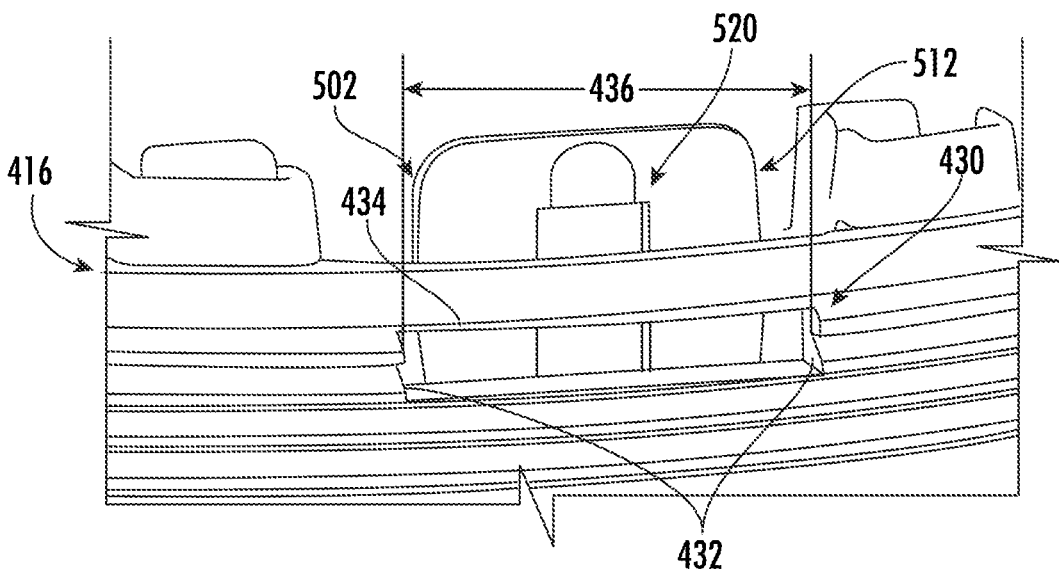
FIG. 6 is a detailed perspective view of the system of FIG. 5 at a location where a filter element of the liquid filtration system engages with a shell housing of the liquid filtration system.

Referring now to FIG. 6, a detailed view of a portion of the system 100 is shown. Specifically, FIG. 6 shows the first retaining member 502 coupled to the shell housing 400. In some embodiments, the shell housing 400 includes the first receptacle 430 extending through the sidewall 408 of the shell housing 400 and configured to receive the first retainer projection 514. The first receptacle 430 may extend through the threaded portion 410 proximate to the upper end 416.

Figure 7:
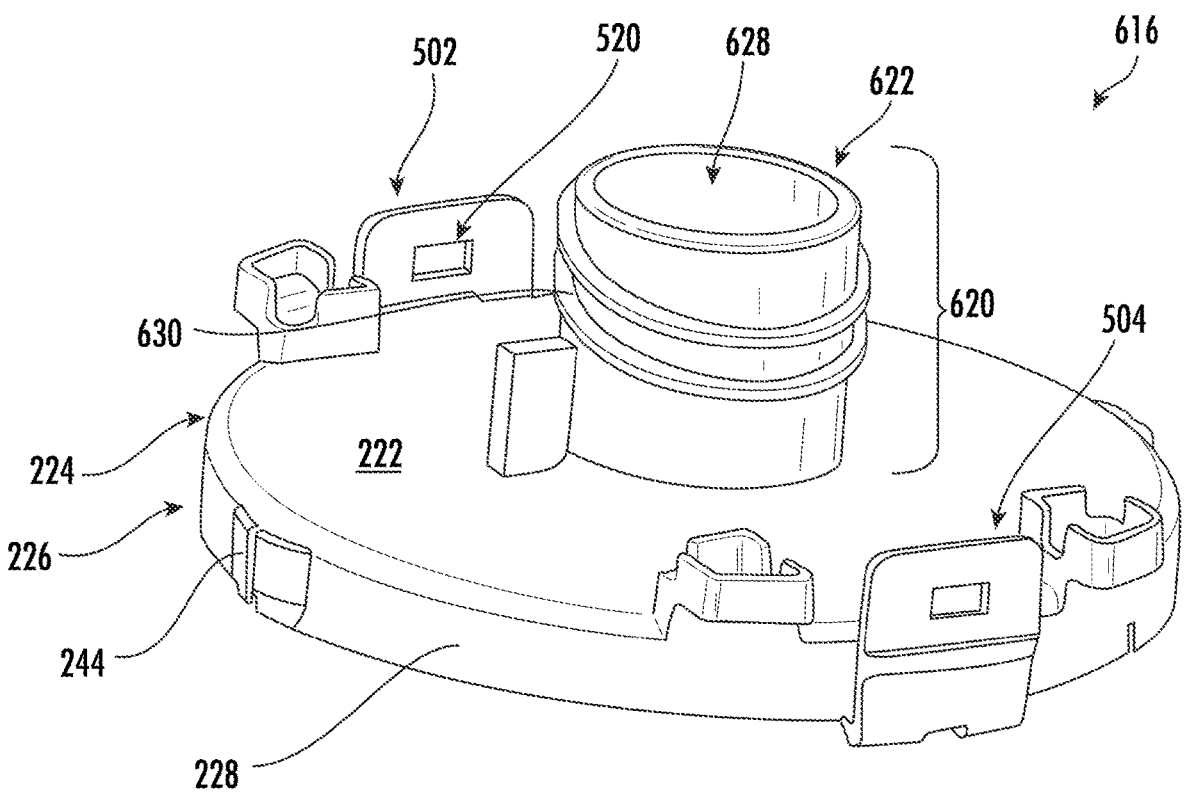
FIG. 7 is a perspective view of a first endcap of a filter element according to another example embodiment.

Turning now to FIG. 7, a first endcap 616 is shown according to another embodiment. In some embodiments, the first endcap 616 is an open endcap having an aperture extending therethrough that is in fluid communication with the central opening 206. The first endcap 616 is similar to the first endcap 216. Accordingly, like numbering is used to designate like parts between the first endcap 616 and the first endcap 216. A difference between the first endcap 216 and the first endcap 616 is that the first endcap 616 includes an interface member 620. The interface member 620 includes a generally cylindrically-shaped protrusion 622 extending from the first surface 222. The protrusion 622 extends upwardly (e.g., vertically upwards) from the first surface 222 in substantially perpendicular orientation relative to the first surface 222. The protrusion 622 defines a central opening, shown as through-hole 628 that extends through the first endcap 616 and through the first surface 222. The through-hole 628 is axially aligned (in coaxial arrangement) with the central axis 210 and the central axis 404. The interface member 620 engages the filter head 300 along an angled sealing interface (shown in FIG. 1).

Among other benefits, the orientation of the sealing interface prevents the use of non-genuine or incorrect filter cartridges that rely on planar radial sealing elements (e.g., sealing elements that extend normal to the central axis 210 of the filter cartridge 200). As shown in FIG. 7, the interface member 620 additionally includes a sealing member 630 (e.g., an O-ring, gasket, ribs, etc.) that is configured to be sealingly engaged with the filter head 300 in order to prevent fluid bypass between the interface member 620 and the filter head 300. The sealing member 630 is tilted at an oblique angle (e.g., an angle other than 90°) with respect to the central axis 210 of the filter cartridge 200 such that a cross-section through the sealing member 630 forms an ellipse. For example, the sealing member 630 may be tilted at approximately 75° with respect to the central axis 210. In some embodiments, the sealing member 630 is tilted within a range between approximately 50°-85° with respect to the central axis 210. In other embodiments, the oblique angle may be within different ranges.

In order to ensure that the sealing member is properly aligned during installation, the filter element 202 may include an anti-rotation member (e.g., the anti-rotation member 244) which engages (e.g., contacts) a portion of the shell housing 400 (e.g., the groove cavity 415) to orient the filter element 202 into alignment relative to a sealing interface on the filter head 300. The extension of the first retainer projection 514 into the first receptacle 430 and the extension of a second projection (similar to the first retainer projection 514) into a second receptacle (similar to the first receptacle 430) may further serve to orient the filter cartridge 200, and more specifically the first endcap 616, such that the interface member 620 and the sealing member 630 are properly aligned within the filter head 300.

Figure 8:
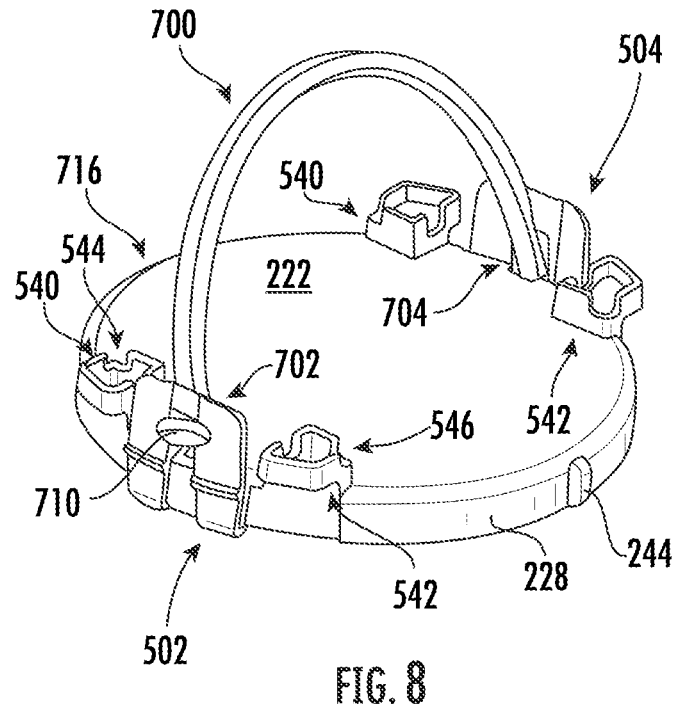
FIG. 8 is a perspective view of a first endcap of a filter element according to yet another example embodiment.

Turning now to FIG. 8, a first endcap 716 is shown according to another embodiment. The first endcap 716 is similar to the first endcap 216. Accordingly, like numbering is used to designate like parts between the first endcap 716 and the first endcap 216. A difference between the first endcap 216 and the first endcap 716 is that the first endcap 716 includes a handle 700 movably coupled to the first retaining member 502 and the second retaining member 504. In other words, a portion of the handle 700 extends through the first orifice 520 in the first retaining member 502 and allows movement of the handle 700 relative to the first retaining member 502 and relative to the first endcap 716. The handle 700 is configured to facilitate coupling and decoupling of the first endcap 716 to the shell housing 400. In some embodiments, the handle 700 is rotatably coupled to the first retaining member 502 and the second retaining member 504. In other words, a portion of the handle 700 extends through the first orifice 520 in the first retaining member 502 and is configured to rotate relative to the first retaining member 502 about an axis extending through the first orifice 520. The handle 700 is positionable between a first handle position and a second handle position. When the handle 700 is in the first handle position, the handle 700 is positioned substantially vertical (e.g., perpendicular to the first surface 222) and the first retaining member 502 and the second retaining member are 504 are in an "unlocked" position (e.g., the first retainer second portion 512 is biased toward the side body surface 228). In the second handle position, the handle 700 is positioned along (e.g., substantially horizontal to) the first surface 222 and the first retaining member 502 and the second retaining member 504 are in a "locked" position (e.g., the first retainer second portion 512 is substantially parallel to the side body surface 228 and the first retainer compliant portion 510 is in a relaxed state).

The handle 700 includes a first handle end 702 coupled to the first retaining member 502 and a second handle end 704 coupled to the second retaining member 504. Between the first handle end 702 and the second handle end 704 the handle 700 defines a generally arched shape, configured to be gripped by a tool or a hand. In some embodiments, the handle 700 defines a different shape, such as a rectangular shape, a wavy shape, a V-shape, a U-shape, and similar shapes. The handle 700 may be formed of plastic, metal, wood, or a similar material with similar properties. The handle 700 and the first endcap 716 may be formed of different materials.

Figure 9:
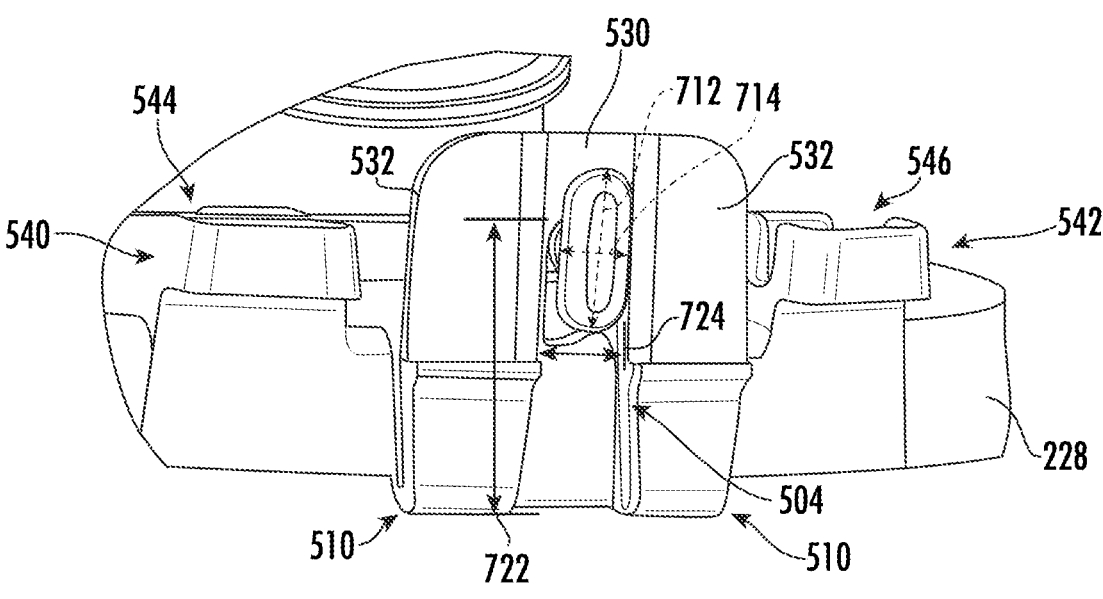
FIG. 9 is a detailed perspective view of a portion of the first endcap of FIG. 8.

Referring now to FIG. 9, a portion of the first handle end 702, shown as a first knob 710, is shown extending through the first retaining member 502. The first knob 710 defines a generally elliptical or lobed shape having a major axis 712 and a minor axis 714. As further described herein, the minor axis of the first knob 710 (e.g., the axis that extends generally parallel to the first surface 222 in FIG. 9) and the first handle end 702 extend in substantially the same direction. Likewise, the major axis (e.g., the axis that extends generally perpendicular to the first surface 222 in FIG. 9) extends in a direction substantially perpendicular to the first handle end 702. The first knob 710 is configured to selectively interface with and bias the first retainer second portion 512 toward the side body surface 228. FIG. 9 shows the handle 700 in the second, or "locked," position. When the handle 700 is in the second handle position, the major axis of the first knob 710 extends generally perpendicular to the first surface 222. In some embodiments, the first retaining member 502 includes a first recess 530 that extends generally perpendicularly to the first surface 222. When the handle 700 is in the second handle position, the first knob 710 is received partially within the first recess 530. In some embodiments, the first recess 530 extends through and interrupts the first retainer projection 514. When the handle

700 is rotated from the second handle position to the first handle position, the first knob 710 interfaces with a portion of the first retainer second portion 512, shown as the first interfacing surfaces 532. The first interfacing surfaces 532 faces radially outward away from the central axis 210. There may be a taper 533 between the first interfacing surfaces 532 and the first recess 530. When the first knob 710 is rotated, the first knob 710 interfaces with the taper 533, biasing the first retainer second portion 512 toward the side body surface 228 and biasing the first retaining member 502 into the "unlock" position.

In some embodiments, the handle 700 further includes a projection, shown as a first locking projection 726. The first locking projection 726 extends away from the handle 700 in a direction substantially similar to the direction of the first knob 710 (e.g., in a direction radially away from the central axis 210 when the handle 700 is coupled to the first endcap 716).

Figures 10, 11:
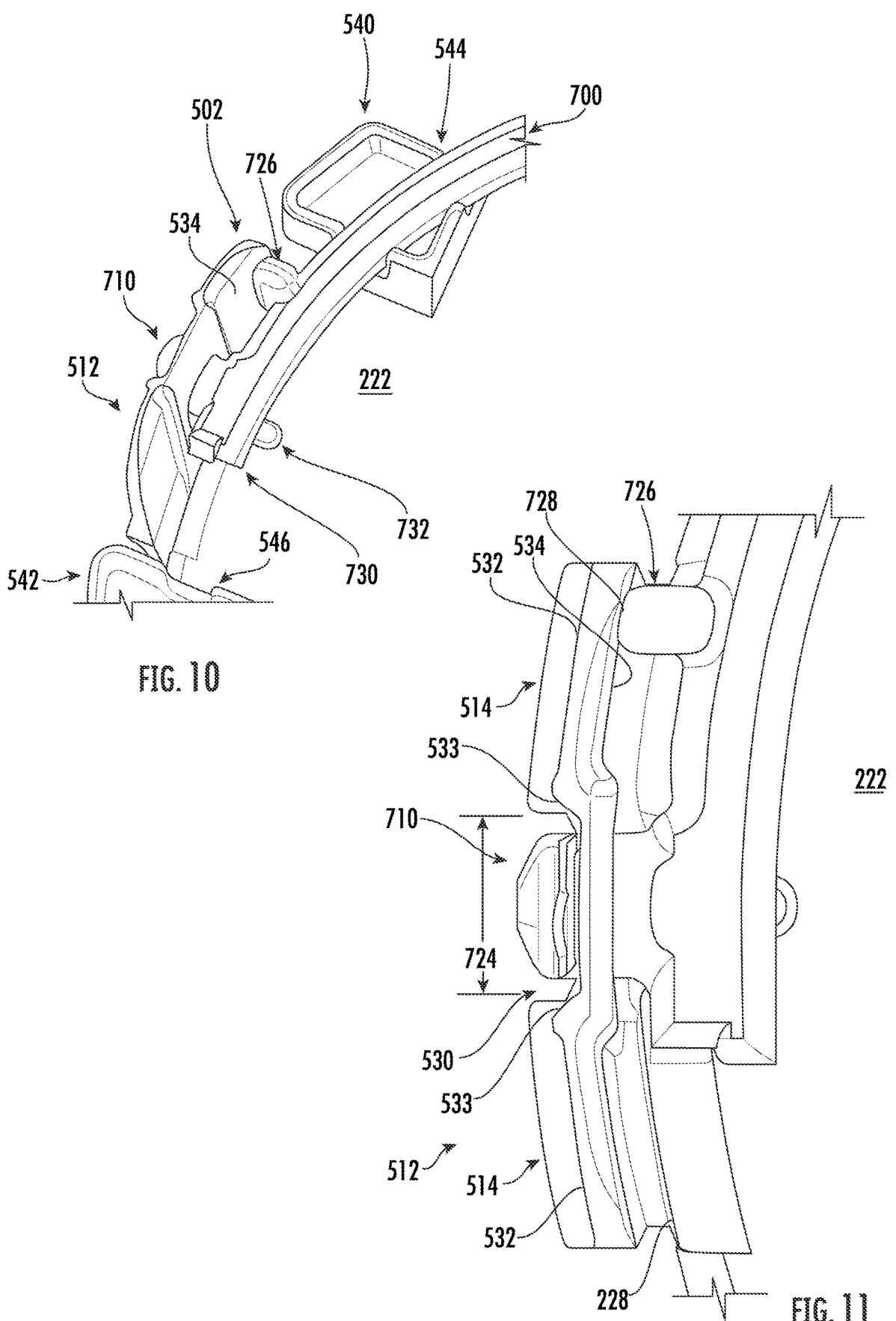
FIG. 10 is a detailed perspective view of a portion of the first endcap of FIG. 8, according to yet another example embodiment.
FIG. 11 is a detailed top view of the portion of the first endcap of FIG. 10.

The first locking projection 726 defines a generally elliptical or pill shape. In some embodiments, the first locking projection 726 defines a rounded rectangular prism, a capsule, an obround capsule, or a similar shape. The first locking projection 726 is configured to selectively interface with and bias the first retainer second portion 512 away from the side body surface 228. FIGS. 10 and 11 show the handle 700 in the second, or "locked," position. When the handle 700 is in the second handle position, a projection surface 728 of the first locking projection 726 interfaces with a portion of the first retainer second portion 512, shown as second interfacing surfaces 534. The second interfacing surfaces 534 face radially inward toward the central axis 210.

When the handle 700 is rotated from the first handle position to the second handle position, the first locking projection 726 interfaces with the second interfacing surfaces 534 and biases the first retainer second portion 512 into engagement with the shell housing 400 (e.g., in a direction radially outward away from the side body surface 228). When the first locking projection 726 biases the first retainer second portion 512 radially outward and away from the central axis 210, the first retainer projection 514 may be biased into the shell groove 413 or the first receptacle 430.

In some embodiments, the handle 700 includes a positioning projection 730 extending from an end of the handle 700 (e.g., the first handle end 702) in a direction generally away from a central axis of the first orifice 520 and the first knob 710. The positioning projection 730 is structured to be received within a positioning cavity 732 formed within the first surface 222. When the handle 700 is in the first handle position, the positioning projection 730 extends into the positioning cavity 732 and resists rotation of the handle 700 out of the first handle position. For example, the tolerances of the first endcap 716 may be such that the first endcap 716 is difficult to position within the shell housing 400 if the handle 700 is in a position other than the first handle position (e.g., between the first handle position and the second handle position). The positioning projection 730 and the positioning cavity 732 cooperate to resist movement of the handle 700 out of the first handle position. Thus, an operator may feel confident that the handle 700 is in the first handle position when positioning the first endcap 716 in the shell housing 400. When the handle 700 is transitioned into the first handle position, the interaction between the positioning projection 730 and the positioning cavity 732 may cause a tactile sensation in the handle 700, indicating to a user of the handle 700 that the handle 700 is in the first handle position. Similarly, when the handle 700 is transitioned away from the first handle position, the positioning projection 730 and the positioning cavity 732 cooperate to induce a tactile sensation in the handle 700.

In some embodiments, the positioning projection 730 and the positioning cavity 732 are reversed such that the positioning projection 730 extends from the first surface 222 and the positioning cavity 732 is formed within an end of the handle 700. For example, the positioning cavity 732 may be formed of a pair of projections (e.g., V-shaped projections) that cooperate to define a valley, where the valley is the positioning cavity 732. The positioning projection 730 may be received within the positioning cavity 732 to prevent rotation of the handle 700 relative to the first endcap 716 when the handle 700 is in the first handle position.

Another difference between the first endcap 716 and the first endcap 216 is that the first orifice 520 in the first endcap 716 extends from the first knob 710 to the first retainer compliant portion 510, interrupting the first retainer projection 514. The first orifice 520 is shown as defining a length 722 and a width 724. The length 722 is greater (e.g., longer) than the major axis 712 of the first knob 710, and the width 724 may be greater than the minor axis 714 of the first knob 710 such that the first knob 710 may fit through the first orifice 520. When assembling the first endcap 716, the handle 700 may be manufactured separately from the first endcap 716 and later coupled to both of the first retaining member 502 and the second retaining member 504 by inserting the first knob 710 through the first orifice 520 and inserting a second knob (similar to the first knob 710) into a second orifice (similar to the first orifice 520 shown in FIG. 14). For example, the handle 700 may exhibit an inherent compliance such that the handle 700 may be squeezed (the first handle end 702 and the second handle end 704 biased toward one another) and then coupled to the first endcap 716 while maintaining the handle 700 substantially parallel to the first surface 222.

Among other benefits, the handle 700 allows an operator or serviceman to break (e.g., disengage, decouple, etc.) the lock, engagement, or seal between the first endcap 716 and the shell housing 400 mechanically via the mechanical advantage offered by the handle 700. The handle 700 also provides a visual indication of whether or not the first endcap 716 is properly coupled to the shell housing 400 (e.g., whether or not the handle 700 is in the second handle position).

Referring back to FIG. 8, the first endcap 716 may include a plurality of fixtures extending from the annular body 220 and configured to engage the handle 700 when the handle 700 is in the second handle position. For example, the plurality of fixtures may retain the handle 700 in the second handle position when the system 100 is moving dynamically (e.g., vibrating, shaking, etc.). The first endcap 716 includes a first handle fixture 540 and a second handle fixture 542. The first handle fixture 540 includes a first cut-out 544 configured to receive the handle 700 when the handle 700 is in the second handle position. The first orifice 520 and the first cut-out 544 cooperate such that the handle 700 is parallel to the first surface 222 when the handle 700 is in the second handle position. In other words, the first orifice 520 and the first cut-out 544 lie within the same plane, the plane being substantially parallel to the first surface 222. Similarly, the second handle fixture 542 includes a second cut-out 546 configured to receive the handle 700 when the handle 700 is in the second handle position. The first orifice 520 and the second cut-out 546 cooperate such that the handle 700 is parallel to the first surface 222 when the handle 700 is in the second handle position. In other words, the first orifice 520 and the second cut-out 546 lie within the same plane, the plane being substantially parallel to the first surface 222. In some embodiments, the first orifice 520, the first cut-out 544, and the second cut-out 546 lie within the same plane.

The first handle fixture 540 and the second handle fixture 542 may be integrally formed with the first endcap 716. In some embodiments, a portion of the first handle fixture 540 extends radially beyond the perimeter of the annular body 220. The portion of the first handle fixture 540 that extends radially beyond the perimeter of the annular body 220 may interface with the upper end 416 of the shell housing 400 when the filter element 202 is inserted into the hollow portion 402. Similarly, a portion of the second handle fixture 542 may extend radially beyond the perimeter of the annular body 220. In some embodiments, the portion of the second handle fixture 542 that extends beyond the perimeter of the annular body 220 may interface with the upper end 416 of the shell housing 400 when the filter element 202 is inserted into the hollow portion 402.

The first endcap 716 may further include the anti-rotation member 244. The anti-rotation member 244 may be configured to interface with the groove cavity 415 formed with the shell housing 400. In some embodiments, the shell housing 400 includes a projection positioned within the shell groove 413 configured to engage a cavity or aperture formed within the first endcap 716. The anti-rotation member 244 may interface with the shell housing 400 and prevent or limit rotation of the shell housing 400 when the first endcap 716 is coupled to the shell housing 400.

Figures 12, 13:
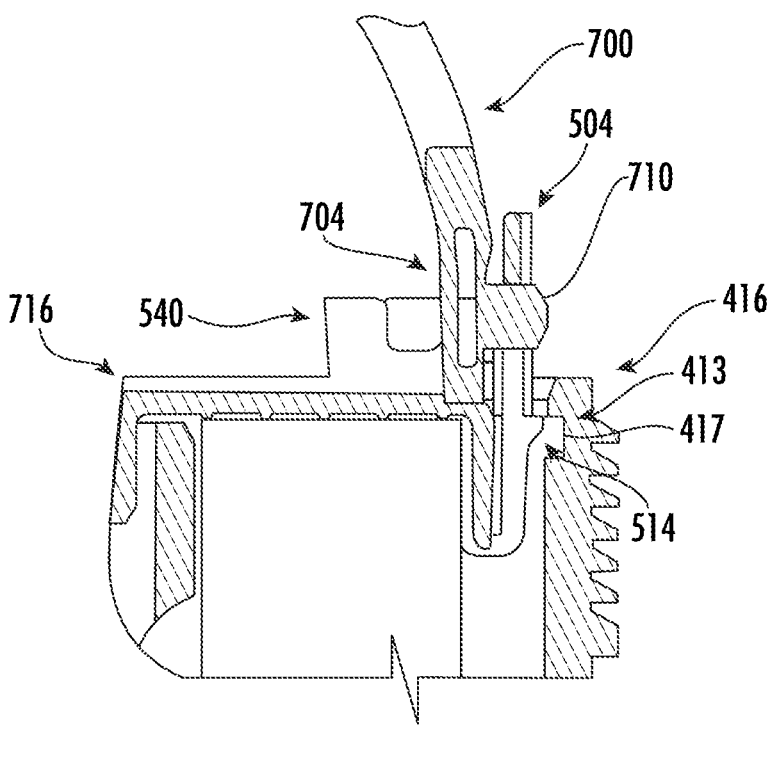
FIG. 12 is a detailed cross-sectional view of a filter cartridge at a location where the first endcap of FIG. 8 engages with a shell housing of the filter cartridge.
FIG. 13 a detailed cross-sectional view of a filter cartridge at a location where the first endcap of FIG. 8 engages with a shell housing of the filter cartridge.

FIGS. 12 and 13 show a detailed cross-sectional view of the second retaining member 504 when the handle 700 is in the first handle position (FIG. 12) and the second handle position (FIG. 13).

Figure 14:
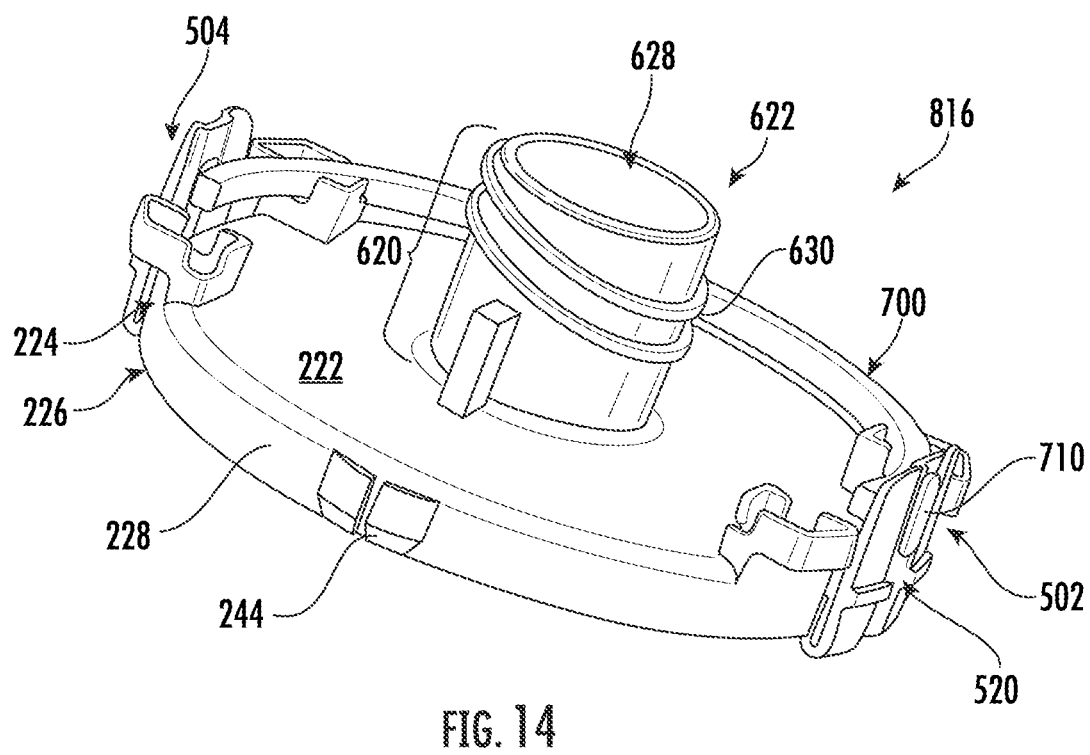
FIG. 14 is a perspective view of a first endcap according to yet another embodiment.

Turning now to FIG. 14, a first endcap 816 is shown according to another embodiment. The first endcap 816 is similar to the first endcap 716. Accordingly, like numbering is used to designate like parts between the first endcap 816 and the first endcap 616. A difference between the first endcap 816 and the first endcap 716 is that the first endcap 816 includes the interface member 620.

Figure 15:
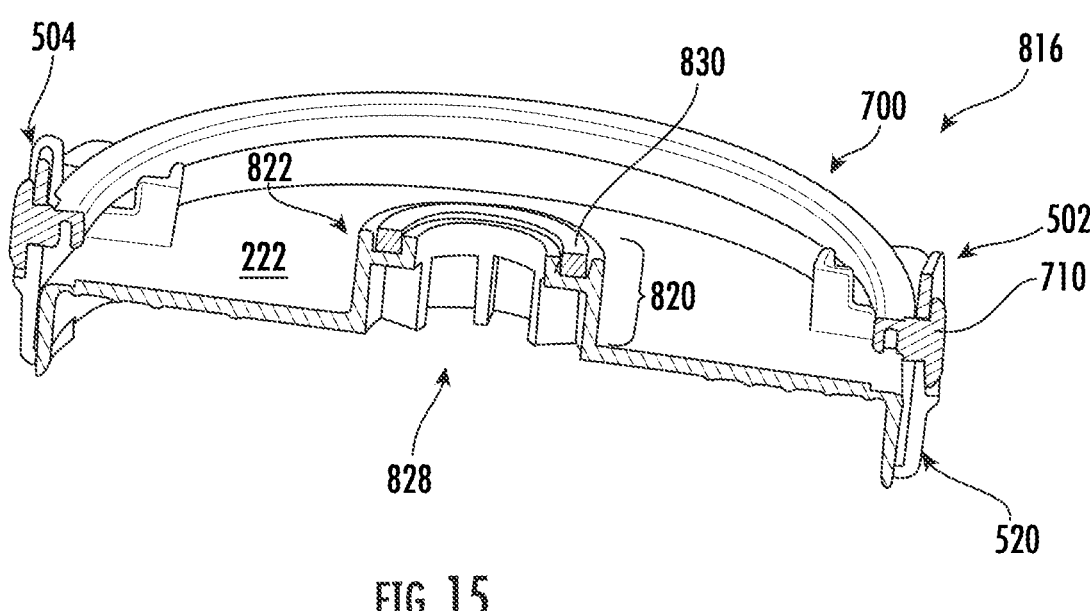
FIG. 15 is a perspective cross-sectional view of the first endcap of FIG. 14, according to another embodiment.

Referring now to FIG. 15, the first endcap 816 is shown according to another embodiment. The first endcap 816 includes an interface member 820. The interface member 820 is similar to the interface member 620. A difference between the interface member 620 and the interface member 820 is that the interface member 820 is configured to form an axial seal with the filter head 300. The interface member 820 includes a generally cylindrically-shaped protrusion 822 extending from the first surface 222. The protrusion 822 extends upwardly (e.g., vertically upwards) from the first surface 222 in substantially perpendicular orientation relative to the first surface 222. The protrusion 822 defines a central opening, shown as through-hole 828 that extends through the first endcap 816 and through the first surface 222. In some embodiments, the through-hole 828 is axially aligned (in coaxial arrangement) with the central axis 210 and the central axis 404. The interface member 820 engages the filter head 300 axially to form an axial sealing engagement with the filter head 300. Specifically, the interface member 820 includes a sealing member 830 (e.g., an O-ring, gasket, rubber washer, etc.) that is configured to be sealingly engaged with the filter head 300 in order to prevent fluid bypass between the interface member 820 and the filter head 300. The sealing member 830 may be positioned within a groove of the protrusion 822, the groove formed by lathing, milling, molding, or similar manufacturing processes. In some embodiments, the sealing member 830 may be coupled to protrusion 822, such as by adhesives, friction, or overmolding. The sealing member 830 is substantially parallel to the first surface 222 and may be concentric about the central axis 210 of the filter cartridge 200. While the interface member 820 is shown as a portion of the first endcap 816, it should be understood that each of the first endcap 216, the first endcap 616, and the first endcap 716 may include the interface member 820.

Figure 16:
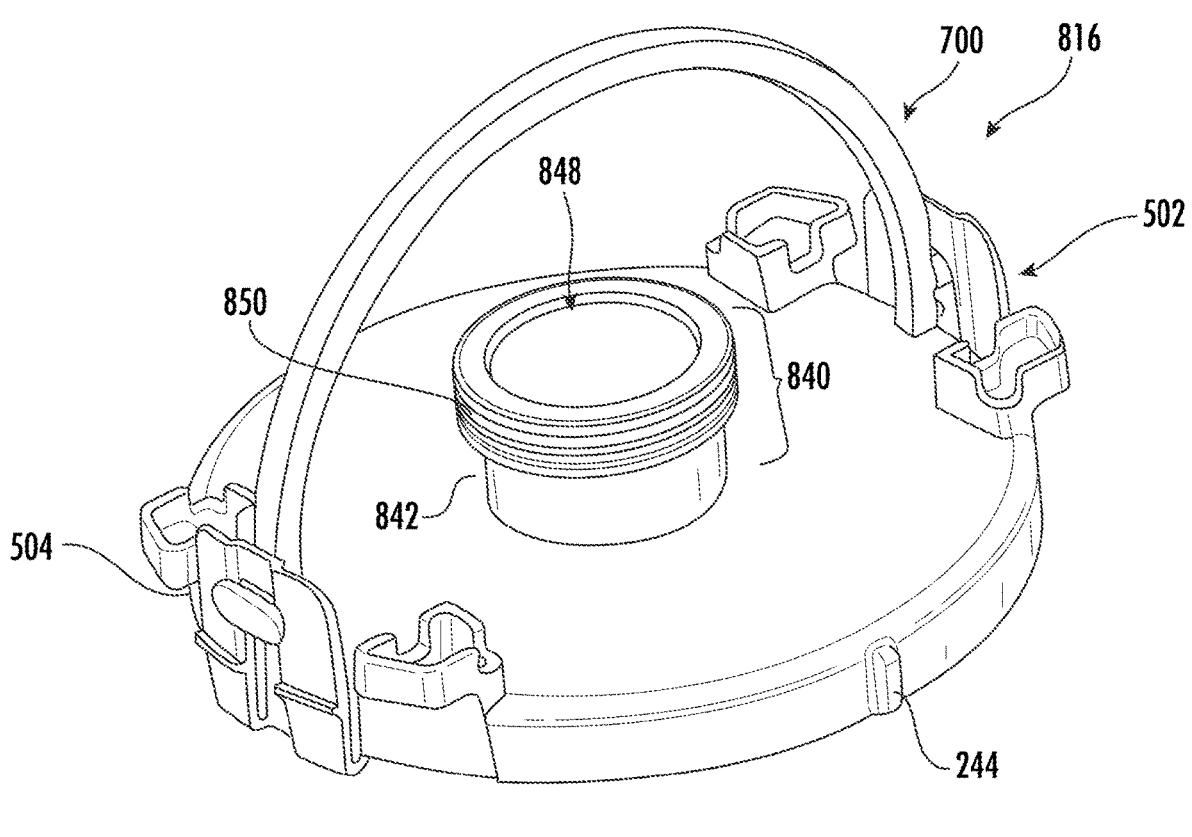
FIG. 16 is a perspective view of the first endcap of FIG. 14, according to another embodiment.

Referring now to FIG. 16, the first endcap 816 is shown according to another embodiment. The first endcap 816 includes an interface member 840. The interface member 840 is similar to the interface member 620. A difference between the interface member 620 and the interface member 840 is that the interface member 840 is configured to form a radial seal with the filter head 300 where the radial seal is formed substantially parallel to the first surface 222. The interface member 840 includes a generally cylindrically-shaped protrusion 842 extending from the first surface 222. The protrusion 842 extends upwardly (e.g., vertically upwards) from the first surface 222 in substantially perpendicular orientation relative to the first surface 222. The protrusion 842 defines a central opening, shown as through-hole 848 that extends through the first endcap 816 and through the first surface 222. In some embodiments, the through-hole 848 is axially aligned (in coaxial arrangement) with the central axis 210 and the central axis 404. The interface member 840 engages the filter head 300 radially to form a radial sealing engagement with the filter head 300. Specifically, the interface member 840 includes a sealing member 850 (e.g., an O-ring, gasket, ribs, etc.) that is configured to be sealingly engaged with the filter head 300 in order to prevent fluid bypass between the interface member 840 and the filter head 300. The sealing member 850 is substantially parallel to the first surface 222 and may be concentric about the central axis 210 of the filter cartridge 200. While the interface member 840 is shown as a portion of the first endcap 816, it should be understood that each of the first endcap 216, the first endcap 616, and the first endcap 716 may include the interface member 840.

Figure 17:
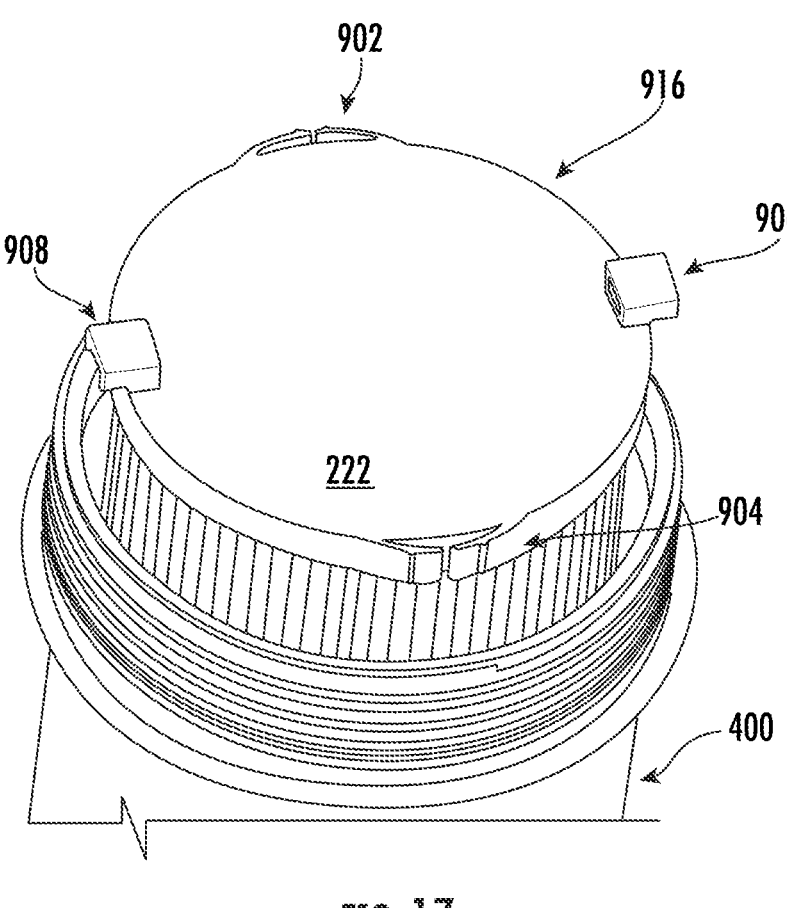
FIG. 17 is a partially exploded perspective view of a portion of a filter cartridge according to an example embodiment.

Referring now to FIG. 17, a first endcap 916 according to an example embodiment. The first endcap 916 is similar to the first endcap 216. A difference between the first endcap 916 and the first endcap 216 is that the first endcap 916 includes retaining members different from the first retaining member 502 and the second retaining member 504. The first endcap 916 includes a first retaining member 902 and a second retaining member 904. The first retaining member 902 and the second retaining member 904 may be positioned 180-rotational degrees apart relative to the central axis 404.

Figure 18:
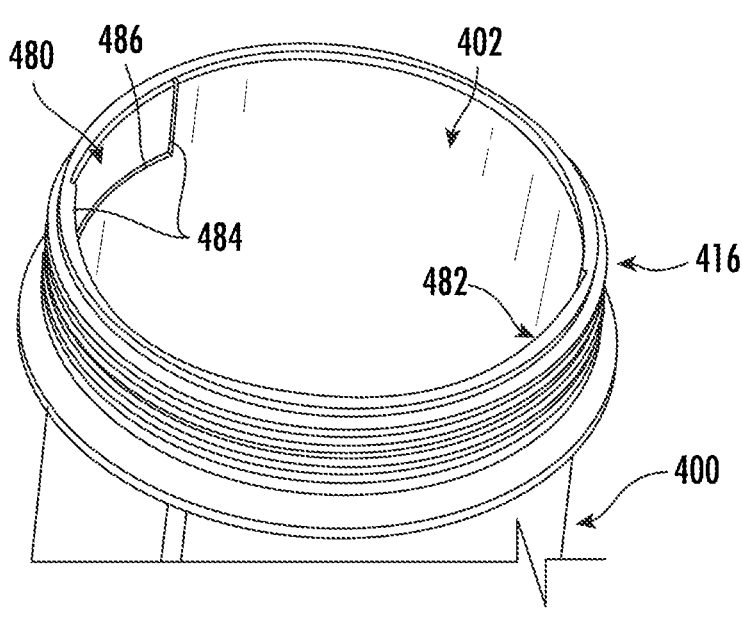
FIG. 18 is a detailed perspective view of the shell housing of the filter cartridge of FIG. 17.

The first endcap 916 is configured to engage cut-outs formed within the shell housing 400. When the first endcap 916 is engaged with the cut-outs, rotation of the filter element 202 relative to the first endcap 916 is limited. In some embodiments, the first endcap 916 engages cut-outs formed within the shell housing 400 and prevents rotation of the filter element 202 when engaged. As shown in FIG. 18, the shell housing 400 includes a first cut-out 480 and a second cut-out 482. The first cut-out 480 is configured to receive the first retaining member 902 and the second cut-out 482 is configured to receive the second retaining member 904. To facilitate positioning of the first endcap 916 within the shell housing 400, the first endcap 916 may include a first flange 906 and a second flange 908 extending beyond a perimeter of the annular body 220. The first flange 906 and the second flange 908 may interface with the upper end 416 of the shell housing 400 when the first endcap 916 is coupled to the shell housing 400.

Turning now to FIGS. 19-21, the first retaining member 502 incudes a first lever 910 and a second lever 912. The first lever 910 and the second lever 912 extend away from the side body surface 228 and extend toward one another. More specifically, the first lever 910 includes a first lever base 914 and a first lever tip 915. The first lever 910 extends away from the annular body 220 at the first lever base 914, but the first lever tip 915 extends in a direction generally circumferentially relative to the annular body 220 such that the first lever tip 915 is separated from the side body surface 228 by a distance, shown as a compression distance 922. The compression distance is less than a distance between the first lever base 914 and the first lever tip 915. In some embodiments, the compression distance 922 is approximately one-third the length of the first lever 910. The second lever 912 is a mirror of the first lever 910. Specifically, the second lever 912 includes a second lever base 918 and a second lever tip 920. The second lever 912 extends away from the annular body 220 at the second lever base 918, but second lever tip 920 extends in a direction generally circumferentially relative to the annular body 220 such that the second lever tip 920 is separated from the side body surface 228 by the compression distance 922. The compression distance 922 is less than a distance between the second lever base 918 and the second lever tip 920. In some embodiments, the compression distance 922 is approximately one-third the length of the second lever 912. The first lever tip 915 and the second lever tip 920 are separated by a small distance of approximately 0.1-2 mm. The first lever base 914 and the second lever base 918 are separated by an arc distance (e.g., circumferential distance) approximately equal to the sum of the lengths of the first lever 910 and the second lever 912. The second retaining member 904 is similar to the first retaining member 902.

When the first endcap 816 is positioned within the shell housing 400, the first retaining member 902 is received within the first cut-out 480. The first lever 910 and the second lever 912 interface with the first cut-out 480 and are biased toward the side body surface 228 by the shell housing 400. Specifically, the first lever tip 915 and the second lever tip 920 are biased toward the side body surface 228, shortening the compression distance 922.

In some embodiments, the first lever 910 includes a first orientation projection 930 extending radially away from an outward-facing surface of the first lever 910 in a direction generally away from the central axis 404. The first orientation projection 930 is positioned between the first lever base 914 and the first lever tip 915, and in some embodiments is approximately positioned in the middle of the first lever 910. The second lever 912 includes a similar second orientation projection 932 extending radially away from an outward-facing surface of the second lever 912 in a direction generally away from the central axis 404. The second orientation projection 932 is positioned between the second lever base 918 and the second lever tip 920, and in some embodiments is approximately positioned in the middle of the second lever 912. The first orientation projection 930 and the second orientation projection 932 cooperate with a first edge 484 and a second edge 485 of the first cut-out 480 to facilitate and, in some embodiments, restrict rotation of the first endcap 916 relative to the shell housing 400 when the first endcap 916 is coupled to the shell housing 400. For example, when an attempt is made to rotate the first endcap 916 clockwise when the first endcap 916 is coupled to the shell housing 400, the second orientation projection 932 may interface with the first edge 484 and prevent further rotation of the first endcap 916 in the clockwise direction, as shown in FIG. 19. Similarly, when an attempt is made to rotate the first endcap 916 counterclockwise when the first endcap 916 is coupled to the shell housing 400, the first orientation projection 930 may interface with the second edge 485 and prevent further rotation of the first endcap 916 in the counterclockwise direction, as shown in FIG. 20.

The first lever 910 and the second lever 912 may rest on a first lower edge 486 of the first cut-out 480, cooperating with the first flange 906 and the second flange 908 to facilitate insertion of the first endcap 916 into the shell housing 400.

FIG. 21 shows a detailed view of a first retaining member 1002, according to another embodiment. The first retaining member 1002 is similar to the first retaining member 902. A difference between the first retaining member 1002 and the first retaining member 902 is that the first retaining member 1002 is formed of a single lever, whereas the first retaining member 902 is formed of the first lever 910 and the second lever 912. The first retaining member 1002 includes a lever arm 1004 that defines a crescent shape. The lever arm 1004 extends away from the side body surface 228 and then wraps back toward the side body surface 228, forming a compression cavity 1006 between the lever arm 1004 and the side body surface 228. When the first endcap 916 is positioned within the shell housing 400, the shell housing 400 biases the lever arm 1004 toward the annular body 220 and into the compression cavity 1006. The lever arm 1004 includes the first orientation projection 930 and the second orientation projection 932, behaving similarly to the first retaining member 902. In some embodiments, an end of the lever arm 1004 is slightly separated from the annular body 220 at a gap 1008. The gap 1008 may increase the compliance of the first retaining member 1002 such that less force is needed to compress the lever arm 1004 into the compression cavity 1006.

Figure 22:
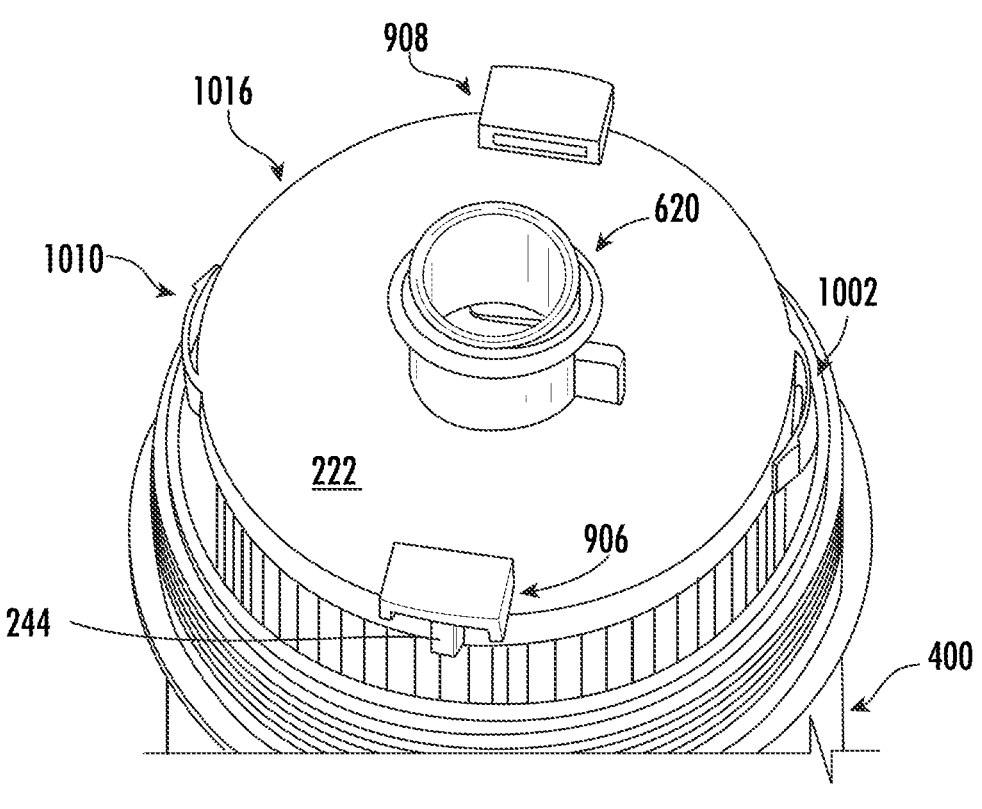
FIG. 22 is a partially exploded view of a filter cartridge according to another embodiment.

Turning to FIG. 22, a first endcap 1016 is shown according to another embodiment. The first endcap 1016 is similar to the first endcap 916. Accordingly, like numbering is used to designate like parts between the first endcap 1016 and the first endcap 916. A difference between the first endcap 1016 and the first endcap 916 is that the first endcap 1016 includes the interface member 620. In some embodiments, the first endcap 1016 includes the interface member 820. In some embodiments, the first endcap 1016 includes the interface member 840. While the first endcap 1016 is shown as including the first retaining member 1002 and a second retaining member 1010 (similar to the first retaining member 1002), the first endcap 1016 may instead include the first retaining member 902 and the second retaining member 904, as the first retaining member 1002 and the second retaining member 1010 are interchangeable with the first retaining member 902 and the second retaining member 904.

Figure 23:
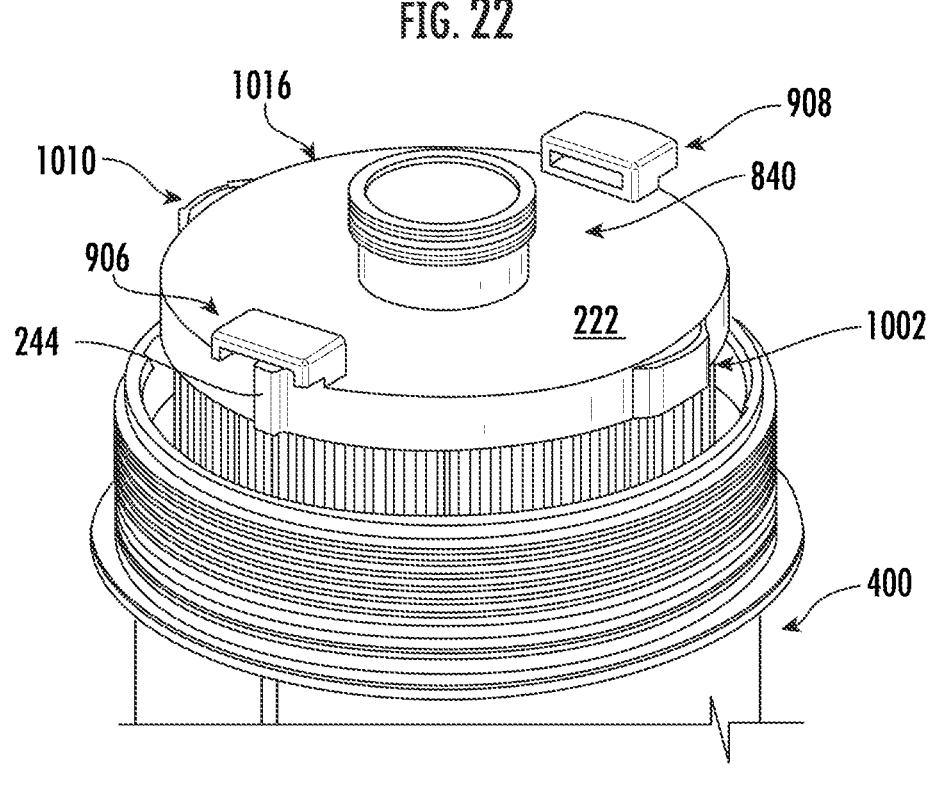
FIG. 23 is a partially exploded view of a filter cartridge according to another embodiment.

Turning to FIG. 23, the first endcap 1016 is shown according to another embodiment. The first endcap 1016 includes the interface member 840. In some embodiments, the first endcap 1016 includes the interface member 820. While the first endcap 1016 is shown as including the first retaining member 1002 and the second retaining member 1010 (similar to the first retaining member 1002), the first endcap 1016 may instead include the first retaining member 902 and the second retaining member 904, as the first retaining member 1002 and the second retaining member 1010 are interchangeable with the first retaining member 902 and the second retaining member 904. The first endcap 1016 may further include the anti-rotation member 244.

While this specification contains many specific implementation details, these should not be construed as limita-tions on the scope of what may be claimed but rather as descriptions of features specific to particular implementa-tions. Certain features described in this specification in the context of separate implementations can also be imple-mented in combination in a single implementation. Con-versely, various features described in the context of a single implementation can also be implemented in multiple imple-mentations separately or in any suitable subcombination. Moreover, although features may be described as acting in certain combinations and even initially claimed as such, one or more features from a claimed combination can, in some cases, be excised from the combination, and the claimed combination may be directed to a subcombination or varia-tion of a subcombination.

As utilized herein, the terms "approximately," "substan-tially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accord-ingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releas-able). Such joining may be achieved with the two compo-nents or the two components and any additional intermediate components being integrally formed as a single unitary body with one another, with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive lan-guage is not generally intended to imply that certain embodi-ments require at least one of X, at least one of Y, and at least one of Z to each be present, unless otherwise indicated.

It is important to note that the construction and arrange-ment of the system shown in the various example imple-mentations is illustrative only and not restrictive in charac-ter. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A liquid filtration system, comprising:
  a filter head;
  a filter cartridge configured to be removably coupled to the filter head, the filter cartridge comprising:

a shell housing defining a first housing end, a second housing end, a housing sidewall extending between the first housing end and the second housing end, and a groove extending circumferentially about the shell housing proximate to the first housing end, the groove including a first groove surface that is contiguous with an inner housing surface of the shell housing and that extends generally perpendicularly to the inner housing surface; and a filter element received within the shell housing and removably coupled to the shell housing, the filter element comprising:

a media pack configured to filter matter from a fluid flowing therethrough; and an endcap coupled to an end of the media pack, the endcap comprising a retaining member engaged with the shell housing, the endcap coupled to the shell housing via engagement of the retaining member of the endcap with the groove defined in the shell housing; and a handle rotatably coupled to the retaining member.

2. The liquid filtration system of claim 1, wherein the handle is operable between a first handle position and a second handle position, the handle biasing the retaining member toward a central axis in the first handle position, and the handle allowing engagement of the retaining member with the shell housing in the second handle position.

3. The liquid filtration system of claim 2, further comprising a handle fixture coupled to a first surface of the endcap, the handle fixture receiving the handle when the handle is in the second handle position.

4. The liquid filtration system of claim 2, wherein the handle is positioned substantially parallel to a first surface of the endcap when the handle is in the second handle position.

5. The liquid filtration system of claim 2, further comprising a knob coupled to the handle and extending through the retaining member, the knob engaging a radially outward-facing surface of the retaining member to bias the retaining member toward the central axis when the handle is in the first handle position.

6. The liquid filtration system of claim 2, further comprising a locking projection coupled to the handle and extending away from the handle, the locking projection configured to engage a radially inward-facing surface of the retaining member to bias the retaining member into engagement with the shell housing when the handle is in the second handle position.

7. The liquid filtration system of claim 1, wherein:

the endcap further comprises an endcap surface; and the retaining member further comprises:

a first retainer first portion extending axially away from the endcap surface;

a first retainer second portion separated from the first retainer first portion by a radial gap; and first retainer projection extending radially from the first retainer second portion and configured to engage the shell housing to couple the endcap to the shell housing.

8. The liquid filtration system of claim 7, wherein the retaining member further comprises:

an orifice extending radially through the first retainer second portion, the orifice configured to receive a tool for biasing the first retainer second portion radially toward the first retainer first portion.

9. The liquid filtration system of claim 7, wherein the retaining member further comprises:

a first retainer compliant portion coupled to the first retainer first portion and the first retainer second portion, the first retainer compliant portion deforming in response to movement of the first retainer second portion radially toward the first retainer first portion.

10. The liquid filtration system of claim 1, wherein the shell housing further comprises:

a receptacle extending radially into the housing sidewall, the receptacle configured to:

receive a portion of the retaining member, and limit rotation of the endcap relative to the shell housing.

11. The liquid filtration system of claim 10, wherein the receptacle extends through the housing sidewall, forming an aperture in the housing sidewall.

12. The liquid filtration system of claim 10, wherein the portion of the retaining member is a projection configured to extend radially into the receptacle, the projection comprising:

a ramp surface configured to engage the shell housing to bias the retaining member toward a center of the filter cartridge; and a stop surface configured to engage the receptacle to prevent translation of the endcap in a direction generally away from the second housing end, wherein the projection is configured to interface with receptacle sidewalls of the receptacle to limit rotation of the endcap relative to the shell housing.

13. The liquid filtration system of claim 1, wherein:

the shell housing further comprises a groove extending about a circumference of the shell housing and a first anti-rotation feature extending from the groove; and the endcap further comprises a second anti-rotation feature extending from a perimeter of the endcap, the second anti-rotation feature configured to engage the first anti-rotation feature to prevent rotation of the endcap relative to the shell housing when the retaining member is coupled to the shell housing.

14. A liquid filtration system, comprising:

a filter head;

a filter cartridge configured to be removably coupled to the filter head, the filter cartridge comprising:

a shell housing defining a first housing end, a second housing end, and a housing sidewall extending between the first housing end and the second housing end; and a filter element received within the shell housing and removably coupled to the shell housing, the filter element comprising:

a media pack configured to filter matter from a fluid flowing therethrough;

an endcap coupled to an end of the media pack, the endcap comprising an endcap surface, and a retaining member engaged with the shell housing, the retaining member comprising:

a first retainer first portion extending axially away from the endcap surface;

a first retainer second portion separated from the first retainer first portion by a radial gap;

a first retainer projection extending radially from the first retainer second portion and configured to engage the shell housing to couple the endcap to the shell housing;

a first retainer compliant portion coupled to the first retainer first portion and the first retainer second portion, the first retainer compliant portion deforming in response to movement of the first retainer second portion radially toward the first retainer first portion; and a handle rotatably coupled to the retaining member.

15. The liquid filtration system of claim 14, wherein the retaining member further comprises:

an orifice extending radially through the first retainer second portion, the orifice configured to receive a tool for biasing the first retainer second portion radially toward the first retainer first portion.

16. A liquid filtration system, comprising:

a filter head;

a filter cartridge configured to be removably coupled to the filter head, the filter cartridge comprising:

a shell housing defining a first housing end, a second housing end, and a housing sidewall extending between the first housing end and the second housing end; and a filter element received within the shell housing and removably coupled to the shell housing, the filter element comprising:

a media pack configured to filter matter from a fluid flowing therethrough;

an endcap coupled to an end of the media pack, the endcap comprising a retaining member engaged with the shell housing; and a handle rotatably coupled to the retaining member, and operable between a first handle position and a second handle position, the handle biasing the retaining member toward a central axis in the first handle position, and the handle allowing engagement of the retaining member with the shell housing in the second handle position; and a knob coupled to the handle and extending through the retaining member, the knob engaging a radially outward-facing surface of the retaining member to bias the retaining member toward the central axis when the handle is in the first handle position.

17. The liquid filtration system of claim 16, further comprising a handle fixture coupled to a first surface of the endcap, the handle fixture receiving the handle when the handle is in the second handle position.

18. The liquid filtration system of claim 16, wherein the handle is positioned substantially parallel to a first surface of the endcap when the handle is in the second handle position.

\* \* \* \* \*